(12) United States Patent
Toroman et al.

(10) Patent No.: US 11,830,166 B2
(45) Date of Patent: *Nov. 28, 2023

(54) FLUID AND RESOLUTION-FRIENDLY VIEW OF LARGE VOLUMES OF TIME SERIES DATA

(71) Applicant: Falkonry Inc., Cupertino, CA (US)

(72) Inventors: Vukasin Toroman, Karlsruhe (DE); Daniel Kearns, Half Moon Bay, CA (US); Lenin Kumar Subramanian, San Jose, CA (US); Nikunj R. Mehta, Cupertino, CA (US)

(73) Assignee: Falkonry Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/681,052

(22) Filed: Feb. 25, 2022

(65) Prior Publication Data

US 2022/0180478 A1   Jun. 9, 2022

Related U.S. Application Data

(63) Continuation of application No. 16/939,568, filed on Jul. 27, 2020, now Pat. No. 11,295,414.

(60) Provisional application No. 62/880,388, filed on Jul. 30, 2019.

(51) Int. Cl.

| | |
|---|---|
| *G06T 3/40* | (2006.01) |
| *G06F 3/04812* | (2022.01) |
| *G06F 12/0891* | (2016.01) |
| *G06F 16/28* | (2019.01) |
| *G06T 11/20* | (2006.01) |
| *G06F 16/2458* | (2019.01) |

(52) U.S. Cl.
CPC ........ *G06T 3/4053* (2013.01); *G06F 3/04812* (2013.01); *G06F 12/0891* (2013.01); *G06F 16/2477* (2019.01); *G06F 16/285* (2019.01); *G06T 11/206* (2013.01)

(58) Field of Classification Search
CPC . G06T 3/4053; G06T 11/206; G06F 3/04812; G06F 12/0891; G06F 3/04847; G06F 16/285; G06F 16/2477
See application file for complete search history.

(56) References Cited

U.S. PATENT DOCUMENTS

| | | | |
|---|---|---|---|
| 6,717,576 B1 | 4/2004 | Duluk et al. | |
| 7,385,608 B1 | 6/2008 | Baldwin | |
| 7,697,816 B2 * | 4/2010 | Takada | H04N 7/181 348/143 |

(Continued)

OTHER PUBLICATIONS

The International Searching Authority, "Search Report" in application No. PCT/US2020/043735, dated Oct. 9, 2020, 15 pages.

(Continued)

*Primary Examiner* — Jin Cheng Wang
(74) *Attorney, Agent, or Firm* — Duane Morris LLP

(57) ABSTRACT

A tile contains aggregated data at a certain resolution for the actual data present in the duration of time covered in that tile. Tiles are generated at every possible resolution suitable for a computer display and provide aggregate measures such as averages and variances. Tiles provide a summary of data such that from the highest level view down to the specific data time points collected, a user's attention may be drawn to the times when there is the most interesting pattern behavior to review and analyze.

20 Claims, 10 Drawing Sheets

Line A: (Mean) The average value for all signal data points between the nearest set of vertical lines (thickest line).
Line B: (Max) The maximum value for all signal data points between the nearest set of vertical lines (thinnest upper line).
Line C: (Min) The minimum value for all signal data points between the nearest set of vertical lines (thinnest lower line).
Lines D: (Standard deviation, +1 σ and -1σ): The standard deviation of all signal data point values between the nearest set of vertical lines (dashed upper and lower lines).

(56) References Cited

U.S. PATENT DOCUMENTS

| | | | |
|---|---|---|---|
| 10,756,948 B1* | 8/2020 | Waugh | H04L 41/0622 |
| 11,295,414 B2* | 4/2022 | Toroman | G06F 16/285 |
| 2012/0007868 A1* | 1/2012 | Buck | G06F 3/04847 |
| | | | 345/440.1 |
| 2013/0262035 A1 | 10/2013 | Mills | |
| 2016/0078654 A1* | 3/2016 | Schlossnagle | G06T 11/206 |
| | | | 345/440.2 |
| 2016/0080438 A1 | 3/2016 | Liang | |
| 2016/0203176 A1* | 7/2016 | Mills | G06F 16/24568 |
| | | | 707/609 |
| 2017/0228460 A1 | 8/2017 | Amel | |
| 2017/0255709 A1* | 9/2017 | Cho | G06F 16/28 |
| 2017/0317874 A1* | 11/2017 | Borah | H04L 47/41 |
| 2018/0032312 A1 | 2/2018 | Hansen | |
| 2018/0246950 A1* | 8/2018 | Arye | G06F 16/2282 |
| 2019/0095508 A1* | 3/2019 | Porath | G06F 16/2471 |
| 2019/0102440 A1* | 4/2019 | Tabak | G06F 40/18 |
| 2019/0171748 A1* | 6/2019 | Duffield | G06F 16/245 |
| 2019/0258677 A1* | 8/2019 | Beedgen | G06F 16/90335 |
| 2020/0082013 A1* | 3/2020 | Triplet | G06K 9/00496 |
| 2020/0167361 A1* | 5/2020 | Princehouse | G06F 3/0649 |
| 2020/0234474 A1* | 7/2020 | Mittelstädt | G06T 11/001 |
| 2020/0334254 A1 | 10/2020 | Arye | |
| 2021/0035266 A1 | 2/2021 | Toroman | |
| 2021/0125387 A1* | 4/2021 | Kawata | G06F 3/14 |

OTHER PUBLICATIONS

Jugel et al., "M4 Visualization-Oriented Time Series Data Aggregation", dated Jun. 30, 2014, pp. 797-808.

Current Claims in application No. PCT/US2020/043735, dated Oct. 2020, 4 pages.

Battle et al., "Dynamic Prefetching of Data Tiles or Interactive Visualization", dated Jun. 30, 2016, SIGMOD Proceedings of the 2016 International Conference on Management of Data, pp. 1363-1375.

Toroman, U.S. Appl. No. 16/939,568, filed Jul. 27, 2020, Notice of Allowance and Fees Due, dated Jan. 20, 2022.

Toroman, U.S. Appl. No. 16/939,568, filed Jul. 27, 2020, Non-Final Rejection, dated Sep. 15, 2021.

Toroman, U.S. Appl. No. 16/939,568, filed Jul. 27, 2020, Interview Summary, dated Mar. 16, 2021.

Toroman, U.S. Appl. No. 16/939,568, filed Jul. 27, 2020, Office Action, dated Jan. 13, 2021.

Toroman, U.S. Appl. No. 16/939,568, filed Jul. 27, 2020, Final Office Action, dated Apr. 2, 2021.

Toroman, U.S. Appl. No. 16/939,568, filed Jul. 27, 2020, Advisory Action, dated May 27, 2021.

* cited by examiner

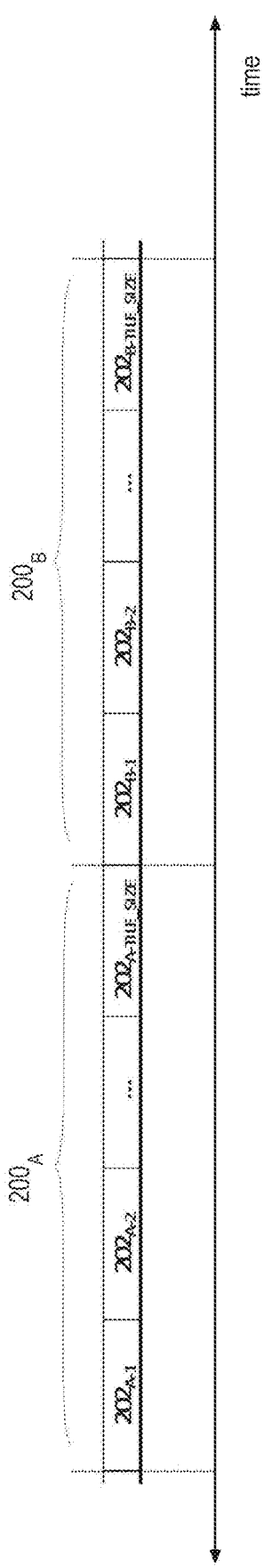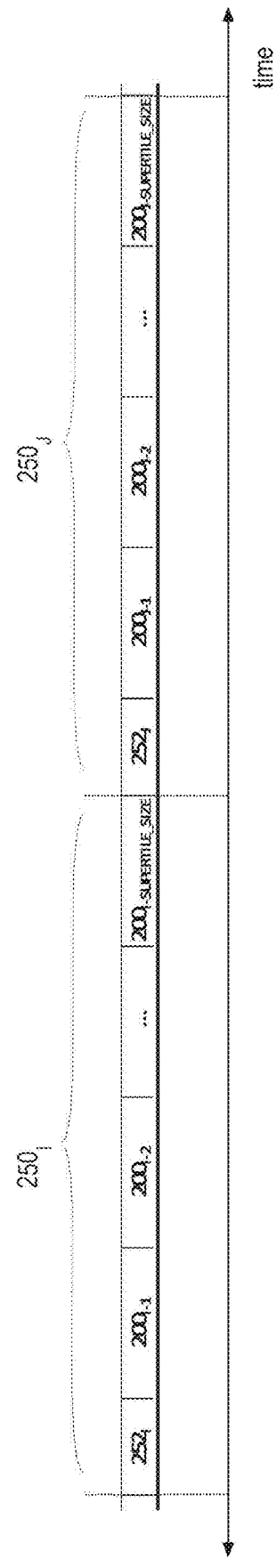

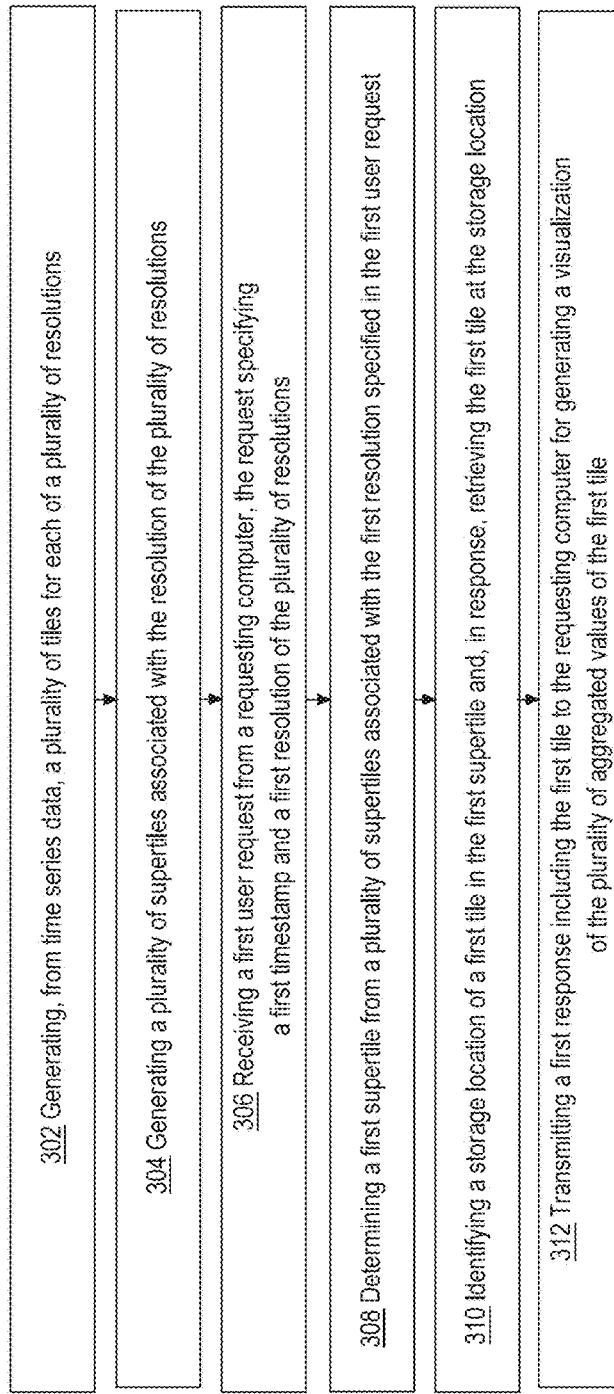
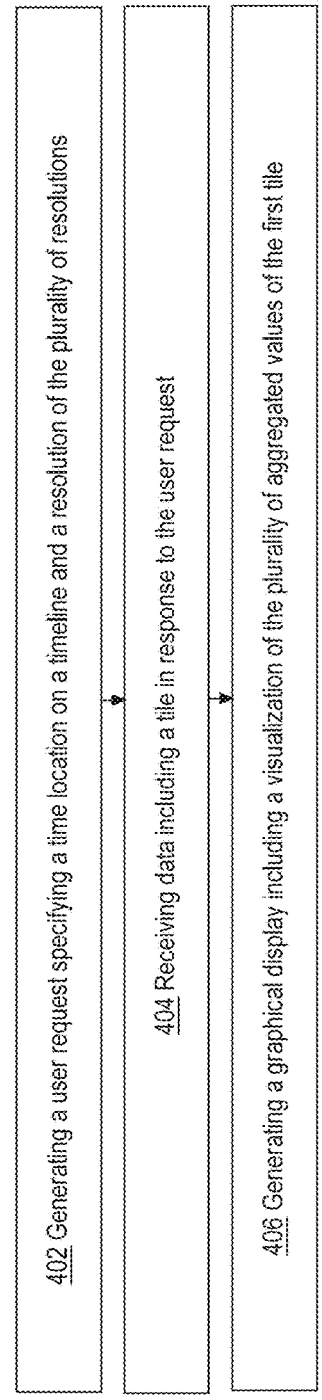

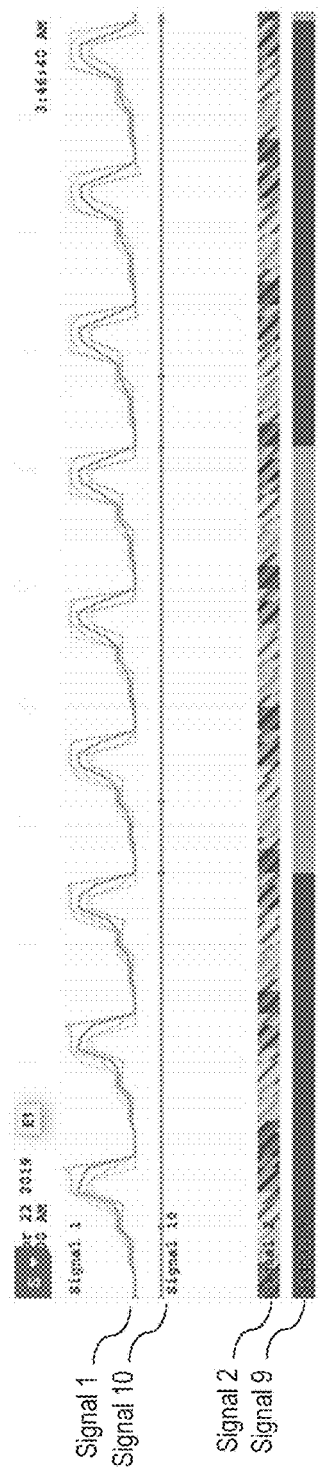

Fig. 5

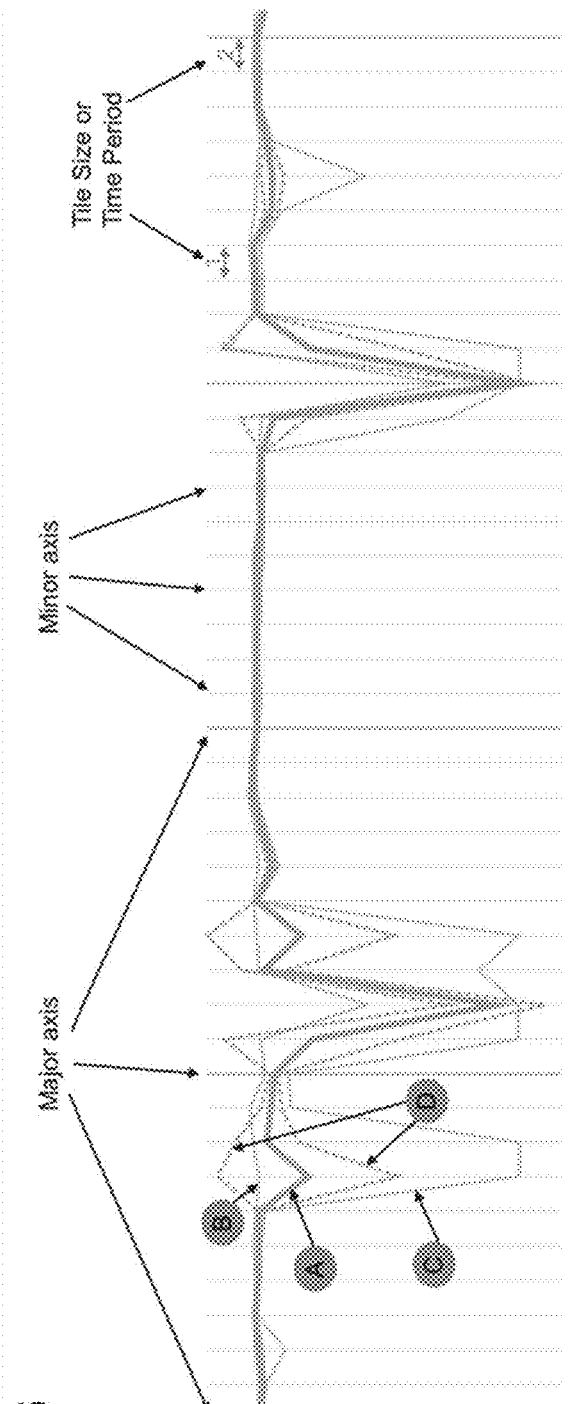

Fig. 6

Line A: (Mean) The average value for all signal data points between the nearest set of vertical lines (thickest line).
Line B: (Max) The maximum value for all signal data points between the nearest set of vertical lines (thinnest upper line).
Line C: (Min) The minimum value for all signal data points between the nearest set of vertical lines (thinnest lower line).
Lines D: (Standard deviation, +1σ and -1σ): The standard deviation of all signal data point values between the nearest set of vertical lines (dashed upper and lower lines).

FLUID AND RESOLUTION-FRIENDLY VIEW OF LARGE VOLUMES OF TIME SERIES DATA

RELATED APPLICATIONS

This application claims the benefit under 35 U.S.C. § 120 as a Continuation of application Ser. No. 16/939,568, filed Jul. 27, 2020, which claims the benefit under 35 U.S.C. § 119(e) of provisional application 62/880,388, filed Jul. 30, 2019, the entire contents of which are hereby incorporated by reference for all purposes as if fully set forth herein. Applicant hereby rescinds any disclaimer of claims scope in the parent applications or the prosecution history thereof and advises the USPTO that the claims in this application may be broader than any claim in the parent applications.

TECHNICAL FIELD

One technical field of the present disclosure relates to methods, systems, computer software, and/or computer hardware in the fields of data processing and data visualization.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Manufacturing and process engineers are increasingly managing and reviewing unprecedented amounts of operational data. For example, machines and sensors in industries, such as oil and gas industry, metals and mining industry, and semiconductor industry, produce terabytes of operational data over time from across the enterprise. There are numerous challenges that arise in managing and reviewing large volumes of data. These challenges range from delivering and presenting data at the frontend to processing and storage limitations at the backend.

Thus, it would be helpful to have an improved solution to processing, storing, and visualizing large volumes of data.

BRIEF DESCRIPTION OF THE DRAWINGS

The present invention is illustrated by way of example, and not by way of limitation, in the figures of the accompanying drawings and in which like reference numerals refer to similar elements and in which:

FIG. 2A illustrates an example tile in accordance with some embodiments.

FIG. 2B illustrates an example supertile in accordance with some embodiments.

FIG. 2C illustrates an example a parquet file in accordance with some embodiments.

FIG. 3 illustrates an example method of processing a large volume of time-series data in accordance with some embodiments.

FIG. 4 illustrates an example method of presenting a large volume of time-series data in accordance with some embodiments.

FIG. 5 illustrates an example interactive graphical user interface showing values of multiple signals in accordance with some embodiments.

FIG. 6 illustrates an example interactive graphical user interface showing values related to a numerical signal in accordance with some embodiments.

DETAILED DESCRIPTION

Figure 1:
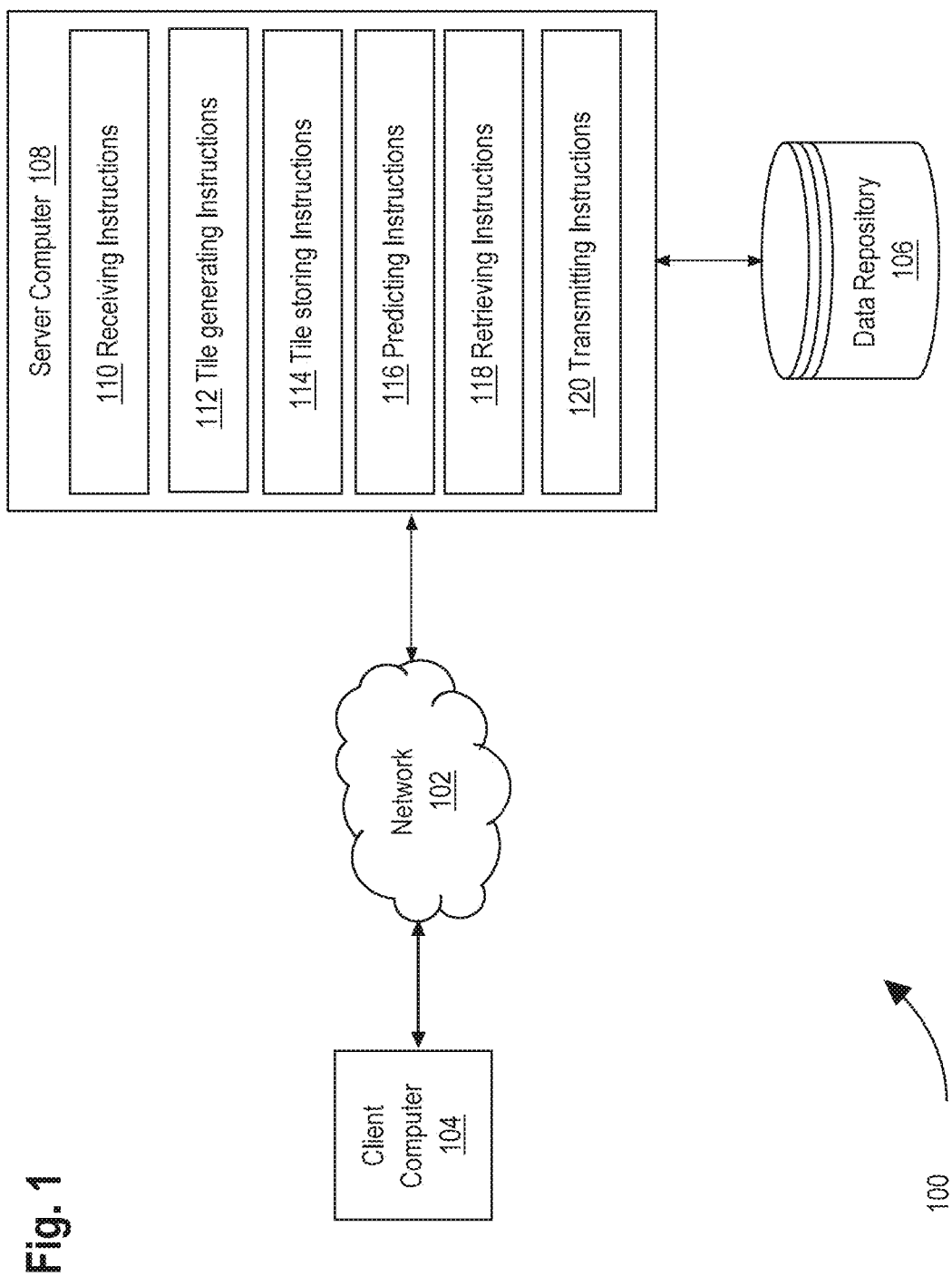
FIG. 1 illustrates an example networked computer system in accordance with some embodiments.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described herein in sections according to the following outline:

1.0 GENERAL OVERVIEW
2.0 SYSTEM OVERVIEW
3.0 STRUCTURAL OVERVIEW
   3.1 GENERAL DATA STRUCTURE
   3.2 TILE IMPLEMENTATION
   3.3 SUPERTILE IMPLEMENTATION
   3.4 COORDINATE SYSTEM
   3.5 STORAGE LAYOUT
   3.6 REQUEST FORMAT
4.0 PROCEDURAL OVERVIEW
5.0 GRAPHICAL USER INTERFACE IMPLEMENTATIONS
   5.1 TIME PLOTS
   5.2 NUMERICAL PLOTS
   5.3 NUMERICAL CAPTIONS
   5.4 DATA GAPS
   5.5 CATEGORICAL PLOTS
   5.6 CATEGORICAL CAPTION
   5.7 VERTICAL CURSOR
   5.8 PROGRESSIVE DETAIL
   5.9 GESTURES
6.0 REAL-TIME PROCESSING
   6.1 TILE TREES
   6.2 TIME-DIMENSION HIERARCHY
   6.3 COORDINATE SYSTEM 6.4 STORAGE
6.5 QUERY SERVICE
7.0 HARDWARE OVERVIEW
8.0 SOFTWARE OVERVIEW
9.0 OTHER ASPECTS OF DISCLOSURE 1.0 GENERAL OVERVIEW

A unified, hierarchical, and responsive treatment of numerical and categorical time series data is a novel and nonobvious means of exploration of operational data and predictions. Specific organization and storage of such data results in a fluid view of very complex data in an easily understood visualization, regardless of resolution, scope, or computing device.

Machines and sensors produce raw or actual operational data that may include time series data. Each time series generally corresponds to one signal and comprises one or more feature vectors for one or more timepoints. Techniques described here provide a foveal view of the actual data using tiles, a tile being a base unit of data transfer. In an embodiment, a tile contains aggregated data at a certain visualization resolution for the actual data present in the duration of time covered in that tile. Tiles are generated at every possible resolution suitable for a computer display and provide aggregate measures such as averages and variances. In this embodiment, every tile at a certain resolution level covers the same relative duration and has starting points so that none of the tiles overlap in terms of timepoints in them. In some embodiments, tiles may be organized into a tree such that leaf nodes of the tree contain raw data at the precise time when the data was recorded, whereas intermediate or branch nodes represent aggregations at different resolutions. Tiles provide a summary of data such that from the highest level view down to the specific data time points collected, a user's attention may be drawn to the times when there is the most interesting pattern to review and analyze.

In one aspect, a computer-implemented method comprises generating, from time series data, a plurality of tiles for each of a plurality of resolutions, wherein each of the plurality of tiles associated with a resolution of the plurality of resolutions corresponds to a first common length of time. The method also includes generating a plurality of supertiles associated with the resolution of the plurality of resolutions, wherein each of the plurality of supertiles corresponds to a group of tiles of the plurality of tiles and includes a supertile header that includes a storage offset of each tile of the group of tiles. The method also includes receiving, after generating the plurality of tiles and the plurality of supertiles, a first user request from a requesting computer, the first user request specifying a first timestamp and a first resolution of the plurality of resolutions and determining a first supertile from a plurality of supertiles associated with the first resolution specified in the first user request. The method also includes identifying a storage location of a first tile in the first supertile and, in response, retrieving the first tile at the storage location, wherein a first duration of time associated with the first tile is dependent on the first resolution specified in the first user request and includes a time of the first timestamp, wherein the first tile comprises a plurality of aggregated values representing all data time points that are in the first duration of time corresponding to the first tile. The method also includes transmitting a first response including the first tile to the requesting computer for generating a visualization of the plurality of the aggregated values of the first tile.

In another aspect, a computer-implemented method comprises generating a user request specifying a time location on a timeline and a resolution of a plurality of resolutions, wherein the user request is for viewing a first signal. The method also includes receiving data including a tile in response to the user request, wherein the tile corresponds to a duration of time covering the time location specified in the user request, wherein the duration of time associated with the tile is dependent on the resolution specified in the user request, wherein the tile comprises a plurality of aggregated values representing all data time points of the first signal that are in the duration of time corresponding to the tile. The method also includes generating a graphical display including a visualization of the plurality of aggregated values of the tile.

Techniques disclosed herein manage unprecedented amounts of operational data, which may be generated at different frequencies, in a manner that expedites processing of requests for viewing the operational data and enhances the visualization of operational data. The techniques involve intelligently organizing raw data and pre-computed aggregate data in storage to allow fast retrieval and the aggregate data on a screen to allow efficient yet informative visualization. The techniques reduce the computational load of a server processing the requests. The techniques also allow high visibility of large data sets with low retrieval latency and storage requirements, as the operational data is visualized over different time spans or at different resolutions. Tiles, which are the base unit of transfer and contain an appropriate amount of raw data or aggregate data, are easily loaded for display in the time it takes a user to specific or navigate to a specific portion of time, allowing the user to view data over different time ranges and resolutions responsively or interactively. Consequently, the disclosed techniques provide numerous technical benefits. One example is reduced use of memory, CPU cycles, network traffic, and other computer resources, resulting in improved machine efficiency, for all the reasons set forth herein.

Other embodiments, aspects, and features will become apparent from the reminder of the disclosure as a whole.

2.0 SYSTEM OVERVIEW

All drawing figures, all of the description and claims in this disclosure, are intended to present, disclose and claim a technical system and technical methods comprising specially programmed computers, using a special-purpose distributed computer system design and instructions that are programmed to execute the functions that are described. These elements execute functions that have not been available before to provide a practical application of computing technology to the problem of difficulty in efficiently and intelligently visualizing large volumes of time series data in an industrial environment. In this manner, the disclosure presents a technical solution to a technical problem, and any interpretation of the disclosure or claims to cover any judicial exception to patent eligibility, such as an abstract idea, mental process, method of organizing human activity or mathematical algorithm, has no support in this disclosure and is erroneous.

FIG. 1 is a block diagram of an example computer network system 100 in which various embodiments may be practiced. FIG. 1 illustrates only one of many possible arrangements of components configured to execute the programming described herein. Other arrangements may include fewer or different components, and the division of work between the components may vary depending on the arrangement.

In the example of FIG. 1, a networked computer system 100 may facilitate the exchange of data between one or more client computers 104 and a server computer 108, which are communicatively coupled directly or indirectly via network 102. Therefore, each of elements 104 and 108 of FIG. 1 may represent one or more computers that host or execute stored programs that provide the functions and operations that are described further herein in connection with processing and visualization operations.

The server computer 108 may be implemented using a server-class computer or other computers having one or more processor cores, co-processors, or other computers. The server computer 108 may be a computer, software and/or hardware or a combination storing instructions that are programmed or configured to store, process, analyze, and send data for visualization. The server computer 108 may be associated with one or more data repositories 106.

In an embodiment, the server computer 108 executes receiving instructions 110, tile generation instructions 112, tile storing instructions 114, predicting instructions 116, retrieving instructions 118, and transmitting instructions 120, the functions of which are described elsewhere herein. Other sets of instructions may be included to form a complete system such as an operating system, utility libraries, a presentation layer, database interface layer and so forth.

The receiving instructions 110 may cause the server computer 108 to receive operational data for processing and/or storage in the data repository 106. In an embodiment, the operational data may be time series data and may be processed for visualization (e.g., viewing) on, for example, a requesting computer such as client computer 104. In an embodiment, the operational data may be actual or raw data generated by a machine, device, or equipment (not illustrated in FIG. 1) during operation of the machine, device, or equipment, or may be predicted data generated by one or more machine learning (ML) prediction models. Time series data may be numerical, categorical, or 2-dimensional images. Example numerical time series data may relate to temperature, pressure, or flow rate generated by a machine, device, or equipment, or confidence scores of state predictions made by a ML prediction model. Example categorical time series data has a fixed set of values, such different states of a machine, device, or equipment, or state predictions made by a prediction model. Example 2-dimensional image time series data could include color, infra-red, ultra-violet, or monochrome fixed point photography or layout information.

The tile generation instructions 112 may cause the server computer 108 to process the operational data (e.g., actual data or predicted data) that includes time series data, to generate a plurality of tiles and a plurality of supertiles, as further discussed next, for each of a plurality of resolutions. Each tile may include metadata that comprises aggregated data for the operational data present in the duration of time covered by that tile. For example, a tile at resolution 0 may cover 10 seconds of operational data and include summary data (e.g., aggregated data) representing the operational data present in that time period of 10 seconds as part of the metadata of that tile. For another example, a tile at resolution 4 may cover 100,000 seconds of operational data and include summary data (e.g., aggregated data) representing the operational data present in that time period of 100,000 seconds as part of the metadata for that tile.

The tile storing instructions 114 may cause the server computer 108 to store the plurality of tiles for each of the plurality of resolutions in the data repository 106. In an embodiment, the plurality of tiles for each resolution may be grouped into a plurality of supertiles for that resolution. The plurality of supertiles for a resolution may be stored in a manner, based on a configuration and/or storage system, of the data repository 106, for quick access and retrieval of a particular tile in the plurality of supertiles. The plurality of supertiles for a resolution may be stored together as a single file (e.g., parquet file) in the data repository 106. The plurality of supertiles for a resolution may be stored as individual files under the same directory for that resolution in the data repository 106. In an embodiment, each tile in a supertile may be compressed and encoded using LZ4 or other techniques known to someone skilled in the art.

The prediction instructions 116 may cause the server computer 108 to apply a trained prediction model to predict warnings, conditions, or states (predicted data) of a machine, device, or equipment, for example, using actual or raw data generated by the machine, device, or equipment. The predicted data generated by the prediction model may be numerical or categorical, and may be the operational data that is processed for visualization (e.g., viewing) on a requesting computer.

The retrieving instructions 118 may cause the server computer 108 to receive a user request (API request), from a requesting computer, to view the processed operational data and, in response, to determine the location of a tile as a unit of transmission corresponding to the request. The retrieving instructions 118 may also cause the server computer 108 to retrieve the tile using the location. The transmitting instructions 120 may cause the server computer 108 to transmit the tile retrieved by the retrieving instructions 118 to the client computer 104 for visualization.

In an embodiment, the computer system 100 comprises components that are implemented at least partially by hardware at one or more computing devices, such as one or more hardware processors executing program instructions stored in one or more memories for performing the functions that are described herein. All functions described herein are intended to indicate operations that are performed using programming in a special-purpose computer or general-purpose computer, in various embodiments. A "computer" may be one or more physical computers, virtual computers, and/or computing devices. As an example, a computer may be one or more server computers, cloud-based computers, cloud-based cluster of computers, docker containers, virtual machine instances or virtual machine computing elements such as virtual processors, storage and memory, data centers, storage devices, desktop computers, laptop computers, mobile devices, and/or any other special-purpose computing devices. Any reference to "a computer" herein may mean one or more computers, unless expressly stated otherwise.

Computer executable instructions described herein may be in machine executable code in the instruction set of a CPU and may have been compiled based upon source code written in JAVA, SCALA, C++, PYTHON, or any other human-readable programming language or environment, alone or in combination with scripts in JAVASCRIPT, other scripting languages and other programming source text. In another embodiment, the programmed instructions also may represent one or more files or projects of source code that are digitally stored in a mass storage device such as non-volatile RAM or disk storage, in the systems of FIG. 1 or a separate repository system, which when compiled or interpreted cause generating executable instructions which when executed cause the computer to perform the functions or operations that are described herein with reference to those instructions. In other words, the drawing figure may represent the manner in which programmers or software developers organize and arrange source code for later compilation into an executable, or interpretation into bytecode or the equivalent, for execution by computer(s).

The data repository 106, coupled with the server computer 108, may include a database (e.g., a relational database, object database, post-relational database), a file system, blob storage, and/or any other suitable type of storage system. The data repository 106 may store operational data, such as actual or raw data generated by a machine, device, or equipment, and/or predicted data generated by a ML prediction model. For example, one or more sensors may detect or measure one or more properties of a machine, device, or equipment during operation of the machine, device, or equipment. An example machine, device, or equipment is a windmill, a compressor, an articulated robot, an IoT device, or other machinery. The actual or raw data may be transmitted or otherwise provided directly or indirectly to the server computer 108, over the network 102, for processing. Processed time series data for one or more signals may be stored in the data repository 106 according to a particular data structure that allows the processed data to be served and/or read as quickly as possible. In an embodiment, the data structure relates to cells, tiles, supertiles, and/or parquet files.

The network 102 broadly represents a combination of one or more wireless or wired networks, such as local area networks (LANs), wide area networks (WANs), metropolitan area networks (MANs), global interconnected internetworks, such as the public internet, or a combination thereof. Each such network may use or execute stored programs that implement internetworking protocols according to standards such as the Open Systems Interconnect (OSI) multi-layer networking model, including but not limited to Transmission Control Protocol (TCP) or User Datagram Protocol (UDP), Internet Protocol (IP), Hypertext Transfer Protocol (HTTP), and so forth. All computers described herein may be configured to connect to the network 102 and the disclosure presumes that all elements of FIG. 1 are communicatively coupled via the network 102. The various elements depicted in FIG. 1 may also communicate with each other via direct communications links that are not depicted in FIG. 1 for purposes of explanation.

The server computer 108 is accessible over network 102 by multiple requesting computing devices, such as the client computer 104. Any other number of client computers 104 may be registered with the server computer 108 at any given time. Thus, the elements in FIG. 1 are intended to represent one workable embodiment but are not intended to constrain or limit the number of elements that could be used in other embodiments.

A requesting computing device, such as the client computer 104, may comprise a desktop computer, laptop computer, tablet computer, smartphone, or any other type of computing device that allows access to the server computer 108. The client computer 104 may send actual or raw data to the server computer 108 for processing and/or may be used to request and to view or visualize processed data.

For example, the client computer 104 may send a user request to view processed data to the server computer 108 and, in response, receive a response including a tile from the server computer 108. A browser or a client application on the client computer 104 may receive the tile and handle decompression and decoding of the tile. The client computer 104 may display data associated with the tile in an interactive graphical user interface (GUI) that allows easy viewing operations, such as zoom, pan, and select gestures, as further described herein.

In an embodiment, the client computer 104 may be responsible for data caching to minimize calls to the server computer 108 (e.g., minimizes latency). The client computer 104 may utilize a DB-based cache and/or an HTTP cache. As an example, when tiles are revisited, such as by zooming back to a granularity previously viewed, the client computer 104 may first check whether a particular tile is locally stored on disk or in memory. If that tile is locally stored, then the client computer 104 reloads that tile from the cache. Otherwise, the client computer 104 sends a user request to the server computer 108 to return the appropriate tile. In an embodiment, each tile received from the server computer 108 may be associated with time expiry data to allow the client computer 104 to relinquish disk space occupied by expiring cached data.

3.0 STRUCTURAL OVERVIEW 3.1 General Data Structure

Time series data generated by a machine, device, or equipment may comprise one or more time series each identified by a time series ID and may be processed by the server computer 108 or a client device to be viewed at different resolutions. A higher resolution at a finer granularity is associated with a shorter time slice in data rendering and visualization. Similarly, a lower resolution at a coarser granularity is associated with a longer time slice in data rendering and visualization.

Each resolution may be associated with a level and a resolution ID that is assigned based on the length of the time slice used as a unit for data processing and visualization. This time slice is referred herein as a step of that resolution. In an embodiment, step sizes are on a logarithmic scale. For example, the step for resolution 0 may have a time slice of length 1 ms, and the step for resolution 12 may have a time slice of length $10^{12}$ ms. In another embodiment, steps may be designed for human consumption.

3.2 Tile Implementation

The time domain may be split into tiles, as illustrated in FIG. 2A. For example, FIG. 2A illustrates tile $200_A$ and tile $200_B$ that correspond with two consecutive time durations or periods in the time domain. Each tile 200 includes a plurality of steps 202. In an embodiment, the tiles 200 may all have the same number of TILE_SIZE steps (although time length covered by each step may vary based on resolutions). For example, tile $200_A$ includes step $202_{A-1}$, step $202_{A-2}$, ..., and step $202_{A-TILE\_SIZE}$; and, tile $200_B$ includes step $202_{B-1}$, step $202_{B-2}$, ..., and step $202_{B-TILE\_SIZE}$.

Data for a single step 202 is referred herein as a cell. A step 202 associated with a base or original resolution (e.g., the resolution corresponding to the frequency at which the raw measurements or data time points are generated) includes the raw measurements or data time points of the time series data within the duration of the time slice of the step 202. In an embodiment, each such cell holds the exact timestamp of the raw measurement. In an embodiment, no cells are maintained at a resolution finer than the raw sampling frequency.

A step 202 associated with a resolution coarser than the base or original resolution may include aggregated values representing all measurements or data time points of the time series data within the duration of the time slice of the step 202. A tile 200 may be encoded as a sequence of TILE_SIZE values, each a cell, corresponding to the TILE_SIZE steps in the tile 200. In an embodiment, the aggregated values of the steps 202 in the tile 200 may be serialized as a JSON array-of-arrays. Other formats, such as XML and YAML, are possible. In an embodiment, each such cell holds the timestamps of the start and end time of the time slice of the step 202.

A cell in a tile 200 may be associated with one or more aggregated values representing all measurements or data time points of one or more time series generated by one or more signals within the time covered by a step. A tile 200 may be also associated with an aggregated value representing all measurements or data time points of the time series data within the time duration of the tile 200. In an embodiment, the aggregated value of the tile 200 may be stored as metadata for the tile 200.

An aggregated value may be calculated using an aggregation function suitable to that type of data. For numerical time series data, examples of aggregation function are MEAN, STDEV, MAX, and MIN. For categorical time series data, examples of aggregation function are count, top, unique, and frequency. For image or 2-dimensional time series data, examples of aggregation function are average and delta.

In an embodiment, a value of a tile at resolution K represents the aggregated data from values of a plurality of tiles at resolution K−1. Similarly, a value of a cell at resolution K may represent the aggregated data from values of a plurality of cells at resolution K−1.

In an embodiment, as many tiles may be created as aggregation functions desired. For example, rather than multiple aggregated values recorded in cells of a single tile, a single aggregated value may be recorded in cells of a single tile, and multiple tiles may be created for the same time duration or period, each for different aggregates.

3.3 Supertile Implementation

In an embodiment, a tile 200 is the base unit of transfer between back-end and front-end (e.g., between the server computer 108 and the client computer 104). A tile 200 thus needs to be small enough to allow for quick transfer but large enough to prevent too many requests. In an embodiment, TILE_SIZE is 10,000 (steps), although other sizes are possible.

Depending on the length of the overall time domain, this may result in a prohibitively large number of tiles, which may have detrimental effects on the underlying storage, such as filesystem overheads and storage processing load.

One technique to avoid such detrimental effects is to organize tiles into a tree, as discussed in Section 6. However, briefly, each level in a tree corresponds to a resolution and new tile nodes are created only when a parent node is full, e.g., contains TILE_SIZE cells. When this happens, the parent tile is reconstructed as aggregated cells and the corresponding number of child tiles based on a factor of conversion to the next lower resolution are created and each holds the previous parent tile's cells as appropriate to their time range. Such dynamic creation of the tree avoids creating more resolutions than are necessary and reduces storage requirements.

Another technique is to group tiles into supertiles, as illustrated in FIG. 2B. Having this extra level of grouping or abstraction of tiles into a supertile may enable a quicker focus on the portion of data that is of interest and reduce the need to access the other portions of the data. For example, FIG. 2B illustrates supertile 250$_I$ and supertile 250$_J$ that correspond with two consecutive time durations or periods in the time domain. Each supertile 250 includes a header 252 and a plurality of tiles 200. In an embodiment, the supertile 250 may contain the same number of SUPERTILE_SIZE individual tiles. For example, supertile 250A includes header 252$_I$, tile 200$_{I-1}$, tile 200$_{I-2}$, . . . tile 200$_{I\text{-}SUPETILE\_SIZE}$; and, supertile 250$_J$ includes header 252$_J$, tile 200$_{J-1}$, tile 200$_{J-2}$, . . . tile 200$_{J\text{-}SUPERTILE\_SIZE}$. Each header 252 stores the respective offset of each tile 200 in a corresponding supertile 250. For example, the header 252$_I$ stores the offsets of tile 200$_{I-1}$, tile 200$_{I-2}$, . . . tile 200$_{I\text{-}SUPERTILE\_SIZE}$, and the header 252$_J$ stores the offsets of tile 200$_{J-1}$, tile 200$_{J-2}$, . . . tile 200$_{J\text{-}SUPERTILE\_SIZE}$.

In an embodiment, SUPERTILE_SIZE is 1,000 (tiles), although other sizes are possible. In an embodiment, each tile 200 in a supertile 250 may be compressed using LZ4 or another suitable data compression algorithm.

Depending on configuration, each time series data may have a maximum and minimum resolution to prevent unneeded tiles from being generated. For example, the maximum or finest resolution may be at resolution −3 (R−3), and the minimum or coarsest resolution may be at resolution 8 (R8).

In an embodiment, a parquet file may be created for each resolution and may be identified using a corresponding resolution ID. FIG. 2C illustrates an example parquet file 275 in accordance with some embodiments. The parquet file 275 contains all supertiles 250 for that resolution as rows. For example, FIG. 2C illustrates supertile 250$_1$, supertile 250$_2$, . . . , supertile 250$_M$. Supertile 250$_1$ includes header 252$_1$, tile 200$_{1-1}$, tile 200$_{1-2}$, . . . tile 200$_{J-N}$. Supertile 250$_2$ includes header 252$_2$, tile 200$_{2-1}$, tile 200$_{2-2}$, . . . tile 200$_{2-N}$. Supertile 250$_M$ includes header 252$_M$, tile 200$_{M-1}$, tile 200$_{M-2}$, . . . tile 200$_{M-N}$. In an embodiment, N is SUPERTILE_SIZE. Each tile 200 in a corresponding supertile 250 may modeled as a column of type byte which contains a compressed array of JSON-formatted cells. Another suitable format, such as XML or YAML, may be used.

Using the techniques described herein, when an API call is received at the server computer 108 for a tile, the tile is easily located as discussed below, and the compressed bytes may be moved directly from the parquet file to a requesting computing device, such as the client computer 104, where a browser or a client application on the client computer 104 handles decompression.

3.4 Coordinate System

A fixed coordinate system may be used to determine supertile, tile, and cell locations. An example of a fixed coordinate system is the Unix epoch.

In an embodiment, the origin for resolution scale is 1 ms, labeled R0 (resolution 0), which means that a cell at R1 (resolution 1) spans 10 ms, and a cell at R−3 (resolution −3) spans 1 μs. In an embodiment, tiles may always be generated and stored at a particular resolution (such as R4 (resolution 4)), such as a resolution most often chosen by a client, even if tiles for other resolutions may not be formed. In an embodiment, coordinates are used directly in array offsets of tiles in supertiles.

Table 1 shows duration calculations for a cell, for a tile, and for a supertile, given a resolution (R). Here, each cell spans the length of time at a particular resolution, with TILE_SIZE being 10,000 and SUPERTILE_SIZE being 1,000.

TABLE 1 cell.duration.µs = 1000 * $10^R$
tile.duration.µs = 10,000 * cell.duration.µs
supertile.duration.µs = 1,000 * tile.duration.µs Table 2 shows resolutions and corresponding durations based on the calculations shown in Table 1.

TABLE 2

| Scale | Cell Duration | Tile Duration | Supertile Duration |
|---|---|---|---|
| −3 | 1 µs | 10 ms | 10 s |
| −2 | 10 µs | 100 ms | 100 s |
| −1 | 100 µs | 1 s | ~16 min |
| 0 | 1 ms | 10 s | ~2.5 hrs |
| 1 | 10 ms | 100 s | ~1 day |
| 2 | 100 ms | 1000 s | ~10 days |
| 3 | 1 s | 10000 s | ~3 months |
| 4 | 10 s | 100000 s | ~3 years |
| 5 | ~2 min | 1000000 s | ~30 years |
| 6 | ~15 min | 10000000 s | ~300 years |
| 7 | ~2.5 hrs | 100000000 s | ~3 millennia |
| 8 | ~1 day | 1000000000 s | eternity |

Using a given time location (timestamp) and a given resolution (R), for example, as identified in a user request, a corresponding cell identifier (cell.abs.id, cell.rel.id), a corresponding tile identifier (tile.id), and a corresponding supertile identifier (supertile.id) may be determined using the coordinate calculations shown in Table 3. The cell identifiers, the tile identifier, and/or the supertile identifier may be used to determine a specific location of data for retrieval and/or visualization.

TABLE 3 cell.abs.id = timestamp/$10^R$
cell.rel.id = cell.abs.id mod 10,000
tile.id = cell.abs.id/10,000
supertile.id = tile.id/1,000

3.5 Storage Layout

In some embodiment, at a given resolution (R), each supertile covers a portion of the time domain with length of TILE_SIZE*SUPERTILE_SIZE*$10^R$ ms. A mapping scheme may be used to assign a supertile, a tile, and a value to any time T for a given resolution.

For example, if the data repository 106 of FIG. 1 is a file system, then
$TIME_SERIES_ID/$RESOLUTION_ID/$SUPER_TILE_ID
may be the directory structure for the filesystem-based data repository, where $TIME_SERIES_ID identifies time series data, $RESOLUTION_ID identifies a resolution, and $SUPER_TILE_ID identifies a supertile. Using such a directory structure allows all supertiles for the same resolution to be stored together for easy, convenient access (e.g., all supertiles for a resolution is stored in the same directory). For another example, as discussed above, a parquet file may be created for each resolution. The parquet file contains all supertiles for that resolution as rows. Therefore, each $RESOLUTION_ID indexes a parquet file, and access to all tiles at this resolution may requires only one file input/output operation.

When an API call (e.g., user request) specifying a timestamp and a resolution, a corresponding supertile is identified and accessed, and a tile is located within the supertile, as described in TABLE 3.

3.6 Request Format

In some embodiments, user requests from requesting computing devices, such as client computer 104, that the server computer 108 processes may be HTTP GET requests. A GET request may include an identifier of the time series data (e.g., $TIME_SERIES_ID), a resolution identifier (e.g., $RESOLUTION_ID), and a time location (e.g., $TIME). The structure of a GET request may be
$TIME_SERIES_ID/$RESOLUTION_ID/$TIME
according to an embodiment.

The server computer 108 translates the request into a path in the data repository 106 to minimize any I/O workload. For example, the $TIME argument translates into a supertile and an internal offset, using the calculations shown in Table 3. The server computer 108 determines the location of the supertile, reads the supertile header of the supertile to determine the required offset (location) of the tile. In an embodiment, a response to a user request is a JSON array associated with the tile covering that time location. In an embodiment, the response has a deflate transfer encoding.

Techniques described herein utilize tiles that are easy to cache in a client computer 104 and can be loaded in the time it takes for a user to navigate to the specific portion of time to be reviewed. These techniques make the display appear fluid and friendly to zoom, pan, and select. When viewing data that is sampled at different rates and with different value ranges, a compact display of tiles makes possible it to jointly analyze the behavior of complex systems with multivariate behavior. The tile design also simplifies the processing of tile requests so as to produce minimal load from requests made by a large number of users for a large number of tiles. The techniques described herein provide users a high level of concurrency and usability over large data sets for very little compute time and total storage relative to raw data.

4.0 PROCEDURAL OVERVIEW

FIG. 3 illustrates an example method of processing a large volume of time-series data in accordance with some embodiments. For example, receiving instructions 110, tile generating instructions 112, tile storing instructions 114, predicting instructions 116, retrieving instructions 118, and/or transmitting instructions 120 may be programmed according to FIG. 3. FIG. 3 may be used as a basis to code method 300 as one or more computer programs or other software elements that the server computer 108 executes or hosts. FIG. 3 is illustrated and described at the same level of detail as used by persons of skill in the technical fields to which this disclosure relates for communicating among themselves about how to structure and execute computer programs to implement embodiments.

At step 302, a plurality of tiles for each of a plurality of resolutions is generated from time series data. The time series data may be numerical or may be categorical. The time series data includes values or data time points. The data time points may be actual data time points of a signal generated by a sensor of an industrial equipment during operation of the industrial equipment at a plurality of time points. The data time points may also be data time points predicted by a trained prediction model.

Each of the plurality of tiles associated with a resolution of the plurality of resolutions corresponds to a first common length of time. For example, each of the plurality of tiles associated with resolution 0 (R0) may correspond to a common time length of 10 seconds. For another example, each of the plurality of tiles associated with resolution 4 (R4) may correspond to a common time length of 100,000 seconds.

At step 304, a plurality of supertiles associated with the resolution of the plurality of resolutions is generated. Each of the plurality of supertiles corresponds to a group of tiles of the plurality of tiles and includes a supertile header that includes a storage offset of each tile of the group of tiles.

Tiles and supertiles may be stored in a data repository a particular manner, depending on the data repository's storage system type, for easy and convenient access and retrieval. For example, a parquet file may be created and stored for each resolution of the plurality of resolutions. A parquet file may include the plurality of supertiles associated with a respective resolution corresponding to the parquet file, as rows in the parquet file. Each tile in each of the plurality of supertiles may be modeled as a column. For another example, if the data repository uses a filesystem structure (e.g., hierarchical directories), then the plurality of supertiles, for each resolution of the plurality of resolutions, may be stored in the same directory location in a common subpath in in the data repository.

In an embodiment, the time series data may be associated with a maximum and minimum resolution to prevent unneeded tiles from being generated and stored. For example, the maximum resolution is at resolution −3 (R−3), and the minimum resolution is at resolution 8 (R8).

At step 306, a first user request is received from a requesting computer. The first user request may be received after the plurality of tiles and the plurality of supertiles are generated. The first user request specifies a first timestamp and a first resolution of the plurality of resolutions. Since the time series data may be associated with a maximum and minimum resolution, the first user request is not a request for data outside the minimum resolution and the maximum resolution associated with the time series data.

In an embodiment, in response to receiving the first user request from the requesting computer, a particular parquet file from a plurality of parquet files is identified and accessed, from the data repository, based on the first resolution specified in the first user request.

At step 308, a first supertile from a plurality of supertiles associated with the first resolution specified in the first user request, is determined. The particular parquet file includes the plurality of supertiles associated with the first resolution. In an embodiment, using the first time location and the first resolution specified in the first user request, a supertile identifier (supertile.id) may be calculated, according to the coordinate calculations shown in Table 3, to identify or determine the first supertile.

At step 310, a storage location of a first tile in the first supertile is identified and, in response, the first tile is retrieved from the storage location. In an embodiment, using the first timestamp and the first resolution specified in the first user request, a tile identifier (tile.id) may be calculated, according to the coordinate calculations shown in Table 3, to identify or determine the first tile. The offset of first tile associated with the tile identifier corresponding to the first tile is then read from the header of the first supertile. The storage location of the first tile is located using the offset.

In an embodiment, a first duration of time associated with the first tile is dependent on the first resolution specified in the first user request and includes a time of the first timestamp. The first tile comprises a plurality of aggregated values representing all data time points that are in the first duration of time corresponding to the first tile. For example, if the time series data is numerical and that tile holds the aggregate values, then the plurality of aggregated values may include a MIN value, a MAX value, a MEAN value, and/or a STDEV value of all data time points that are in the first duration of time corresponding to the first tile. For another example, if the time series data is categorical and that tile holds the aggregate values, then the plurality of aggregated values includes a count value, a top value, a unique value, and/or a frequency value of all data time points that are in the first duration of the time corresponding to the first tile.

At step 312, a first response including the first tile is transmitted to the requesting computer for generating a visualization of the plurality of aggregated values of the first tile. A browser or a client application on the requesting computer receives the tile and handles decompression and decoding of the tile and displays data associated with the tile in an interactive graphical user interface in a manner that appears fluid and friendly to zoom, pan, and select gestures.

In an embodiment, a second tile may be retrieved in response to receiving a second user request subsequent to the first user request.

When the second user request is associated with a zoom gesture, the second tile has a length of time that is different from the first duration of time and comprises a second array of cells that corresponds to a second duration of time covering the time of the first timestamp. The second tile is in a supertile that is associated with a second resolution and timestamp corresponding with the zoom gesture.

When the second user request is associated with a pan gesture, the second tile has a length of time that is the same as the first duration of time and comprises a second array of cells that corresponds to a second duration of time covering a time of a second timestamp that is different from the time of first timestamp. The second tile may be in the same supertile or in a different supertile that is associated with the first resolution, depending on the time interval boundary of the supertiles.

FIG. 4 illustrates an example method of viewing a large volume of time-series data in accordance with some embodiments. FIG. 4 may be used as a basis to code method 400 as one or more computer programs or other software elements that the client computer 104 executes or hosts. FIG. 4 is illustrated and described at the same level of detail as used by persons of skill in the technical fields to which this disclosure relates for communicating among themselves about how to structure and execute computer programs to implement embodiments.

At step 402, a user request is generated. The user request specifies a time location on a timeline and a resolution of the plurality of resolutions. The user request is for viewing a first signal. The first signal may include data time points generated by an industrial equipment during operation of the industrial equipment or predicted by a trained prediction model.

At step 404, data including a tile is received in response to the first user request. The tile may be retrieved from a local cache. Alternatively, the tile may be received from a remote server. The tile may be locally cached after the tile is received from the remote server. In an embodiment, the tile may have an expiration time such that the tile is deleted from local cache after the expiration time. The local cache may be a DB-based cache and/or an HTTP cache.

The tile corresponds to a duration of time covering the time location specified in the user request. The duration of time associated with the tile is dependent on the resolution specified in the user request. For example, the duration of time associated with the tile may correspond to a time period of 10 seconds when the specified resolution is resolution 0 (R0). For another example, the duration of time associated with the tile may correspond to a time period of 100,000 seconds when the specified resolution is resolution 4 (R4).

In an embodiment, the tile comprises a plurality of aggregated values representing all data time points of the first signal that are in the duration of time corresponding to the tile. For example, if the first signal is a numerical signal, then the plurality of aggregated values may include a MIN value, a MAX value, a MEAN value, and/or a STDEV value of all data time points of the first signal that are in the duration of time corresponding to the tile. The plurality of aggregated values representing the first signal may be displayed as a plurality of summary lines (each summary line corresponding to an aggregated value) on one screen and/or at the same time. When a summary line from the plurality of summary lines is missing one or more data points forming a data gap, two nearest data points on either side of the data gap of the summary line may be connected using a straight line.

For another example, if the first signal is a categorical signal, then the plurality of aggregated values includes a count value, a top value, a unique value, and/or a frequency value of all data time points of the first signal that are in the duration of the time corresponding to the tile. The data time points may relate to one or more categorical events. The first signal may be displayed as a barber-pole that includes a color stripe for each of the one or more categorical events. In an embodiment, the plurality of aggregated values may be displayed as proportional bars.

At step 406, a graphical display is generated. The graphical display includes a visualization of the plurality of aggregated values of the tile. The plurality of aggregated values of the tile provides a summary of data time points in the duration of time associated with the tile.

In an embodiment, the graphical display may also include a visualization of a second signal that is plotted on the same timescale that the first signal is plotted. The second signal and the first signal are visually aligned. The second signal and the first signal may be sampled at different rates.

In an embodiment, a mouse-over input at a particular cursor position on the first signal may be received. In response to receiving the mouse-over input, a vertical cursor at the particular cursor position may be generated. The vertical cursor may run vertically across all plots in the graphical display. In addition, a caption may also be generated. The caption may indicate at least one of the plurality of aggregated values of the first signal at the particular cursor position.

5.0 GRAPHICAL USER INTERFACE IMPLEMENTATIONS

Figure 7:
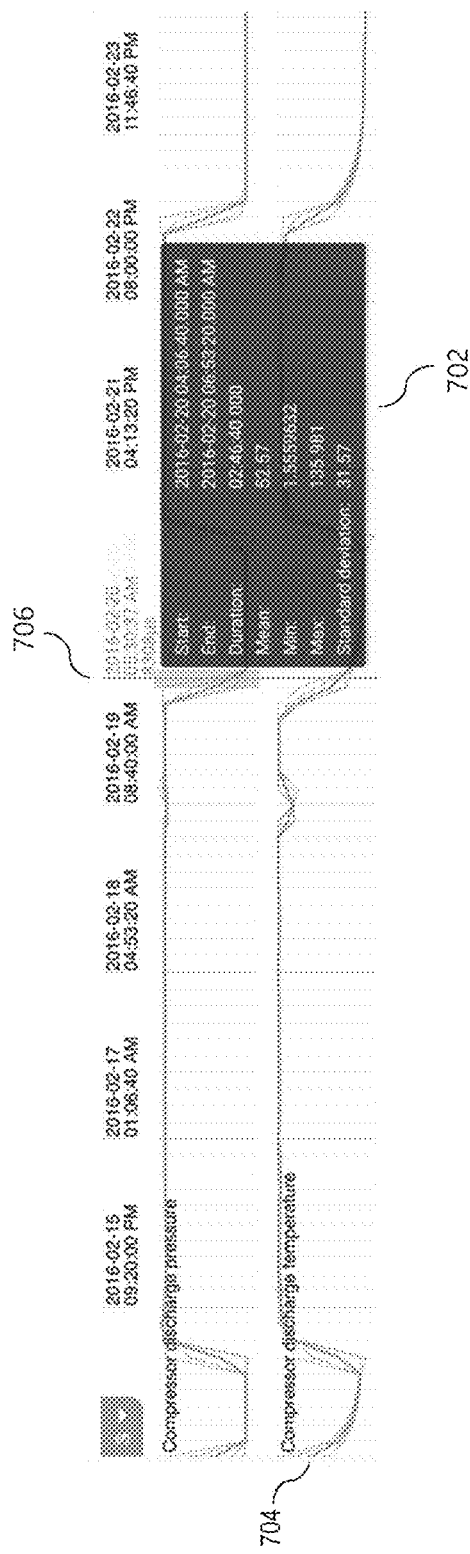
FIG. 7 illustrates an example interactive graphical user interface showing a caption for a numerical signal in accordance with some embodiments.

In an embodiment, an interactive graphical user interface may show a plurality of signals including categorical and numerical signals. Time is maintained synchronously across all signals in the graphical user interface. In other words, all signals are concurrently plotted and visually aligned in terms of time (as illustrated in FIGS. 5 and 7, for example). A first selection feature in the graphical user interface may be a toggle or a selection to select a model from a plurality of machine learning prediction models to predict outcomes based on trained data. A prediction may be a condition or an event. Upon selection of a model, a "prediction" signal is generated based on the selected model and can be compared with an actual signal. In an embodiment, a prediction signal may be a categorical signal. A second selection feature on the left of the graphical user interface may be a selection to view or access operational data provided by a client computer. A third selection feature on the left of the graphical user interface may be a selection to view or set events. An event indicates a system issue or a system state.

5.1 Time Plots

Numerical and categorical signals may be plotted on the same timescale and aligned visually. FIG. 5 illustrates an example interactive graphical user interface showing signals. The top two signals, Signal 1 and Signal 10, are numerical signals. The bottom two signals, Signal 2 and Signal 9, are categorical signals. The timelines are synchronized across the four signals. These timelines may correspond to one or more tiles covering consecutive time periods.

5.2 Numerical Plots

Numerical signals may be rendered as line charts. A line chart for a numerical signal may include a plurality of summary lines corresponding to aggregated values discussed above, which help the user understand the underlying signal even when the individual data time points cannot be resolved due to the current resolution or zoom level. FIG. 6 illustrates an example interactive graphical user interface showing a numerical signal represented by a plurality of summary lines. In an embodiment, the numerical signal is represented by five (5) summary lines that represent the mean, maximum, minimum, and standard deviation of the numerical signal values over time durations at the current resolution. A pair of consecutive vertical lines shown in FIG. 6 denotes a time duration associated with a cell (e.g., labeled as 1 and 2). The time durations have the same length of time that is associated with a tile at the current resolution.

Mean is the average value for all signal data time points between the nearest set of vertical lines (thickest line). Max is the maximum value for all signal data time points between the nearest set of vertical lines (thinnest upper line). Min is the minimum value for all signal data time points between the nearest set of vertical lines (thinnest lower line). Standard deviation ($+1\sigma$ and $-1\sigma$) of all signal data time point values between the nearest set of vertical lines (dashed upper and lower lines). These five (5) summary lines help provide a visual cue of where variances are in the data.

5.3 Numerical Captions

When mousing-over a numerical signal at a particular point in the timeline for a specific resolution, a caption may be shown that indicates the exact values of each of the summary lines at the particular point. If the value is a raw value, then a single timestamp is indicated in the caption. If the value represents an aggregate, then the start and end of the time range whose values are aggregated as shown in the caption are indicated in the caption.

When zoomed out, individual data time points may not be resolved, and there may be multiple data time points between the vertical lines. When zoomed in sufficiently, individual data time points may be resolved (as points on the signal display) such that there is only one point between each set of vertical lines.

FIG. 7 illustrates an example interactive graphical user interface showing a caption 702 for a numerical signal 704 that indicates the exact values of the summary lines at the current resolution and cursor position within a timeline. A thin line 706 at the cursor position may run vertically across all displayed plots, including a plot for the numerical signal 704. Other plots may be numerical signals and/or categorical signals. In an embodiment, the caption 702 may also indicate a particular date, the start and end times, time duration, and the aggregated values based on where the cursor is positioned at on the plot.

5.4 Data Gaps

Figure 8:
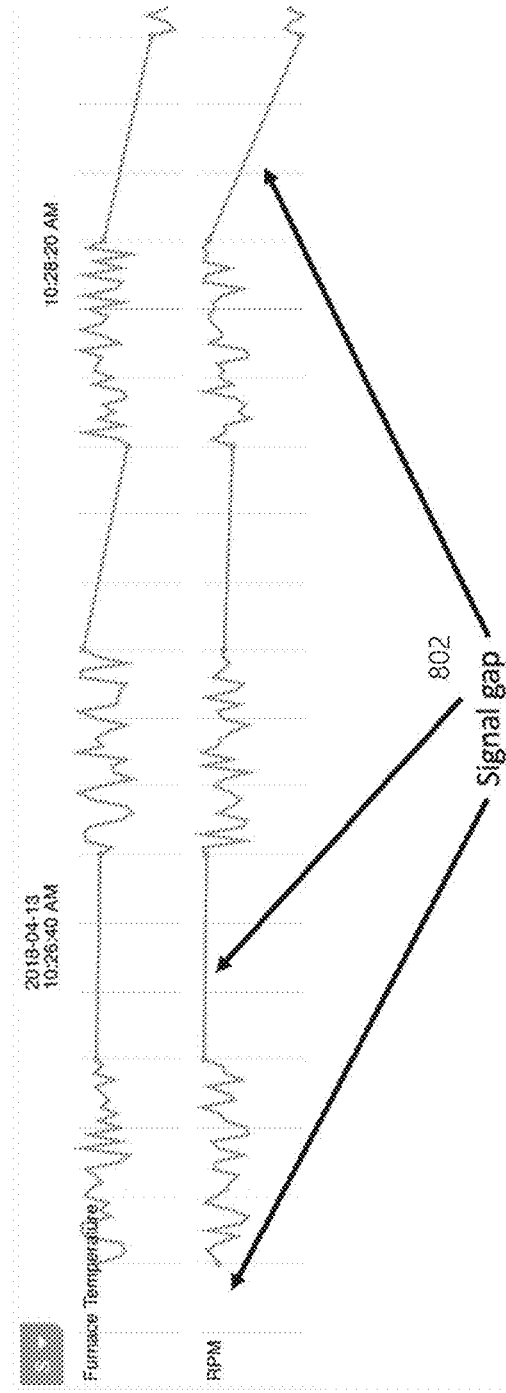
FIG. 8 illustrates an example display of missing values in summary lines in accordance with some embodiments.

FIG. 8 illustrates an example interactive graphical user interface showing a display of missing values in summary lines. When summary lines have missing values, as seen in the marked portions 802 in FIG. 8, the two (2) nearest data time points on either side of each gap 802 may be connected with a straight line.

5.5 Categorical Plots

Figure 9:
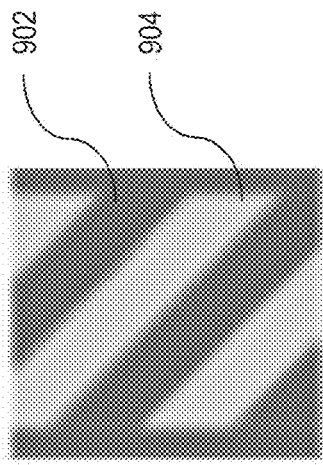
FIG. 9 illustrates an example interactive graphical user interface showing values related to a categorical signal in accordance with some embodiments.

A categorical signal may be either plotted as a color band across the time dimension or, when there are multiple labels too close to each other for display, as separate colors in a barber-pole. FIG. 9 illustrates an example barber-pole. Each barber-pole may have as many color stripes as there are categorical events or conditions in that time period. In FIG. 9, the barber-pole includes two (2) color stripes representing two categorical events or conditions 902, 904. In other examples, three categorical events might have occurred in the time period, and the barber-pole would constitute a repetition of a stack of three equal wide color stripes. In other embodiments, the barber-poles could be shown to directly indicate aggregate statistics, which for categorical values would refer to either one of categorical values or a distribution of the categorical values. For example, instead of showing stripes of the same width multiple times, the barber-pole could show each color stripe only once but in a width proportional to the number of occurrences of the corresponding condition in the time period. The barber-pole could also show the color stipes in a specific order, such as showing the color stripes in an order of the frequency of occurrence of the corresponding condition in the time period. In this way, the barber-pole could show the distribution, the max, the min, or the count for the categorical values in the time period.

5.6 Categorical Caption

Figure 10:
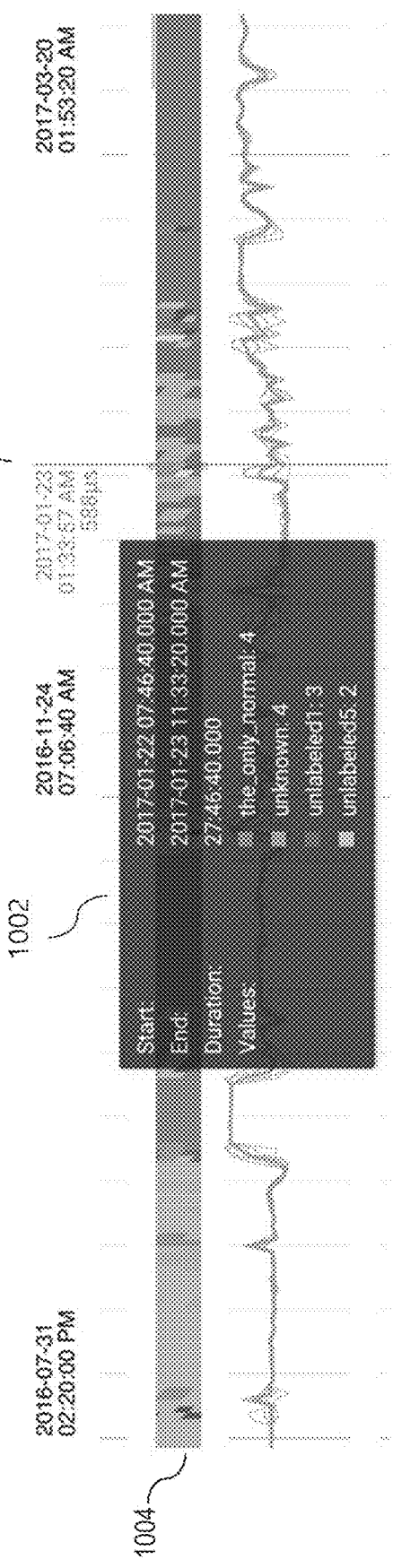
FIG. 10 illustrates another example interactive graphical user interface showing a caption for a categorical signal in accordance with some embodiments.

FIG. 10 illustrates an example interactive graphical user interface showing a caption 1002 for a categorical signal 1004 at the current resolution and cursor position within a timeline. A thin line 1006 at the cursor position may run vertically across all displayed plots, including a plot for the categorical signal 1004. Other plots may be numerical signals and/or categorical signals. In an embodiment, the caption 1002 may also indicate a particular date, the start and end times, time duration, and the frequency of each categorical event or condition based on where the cursor is positioned at on the plot. In FIG. 10, the categorical signal 1004 includes four (4) categorical events or conditions labeled as "the_only_normal," "unknown," "unlabeled1," and "unlabeled5" that have frequencies values of 4, 4, 3, and 2, respectively.

5.7 Progressive Detail

Figure 11A:
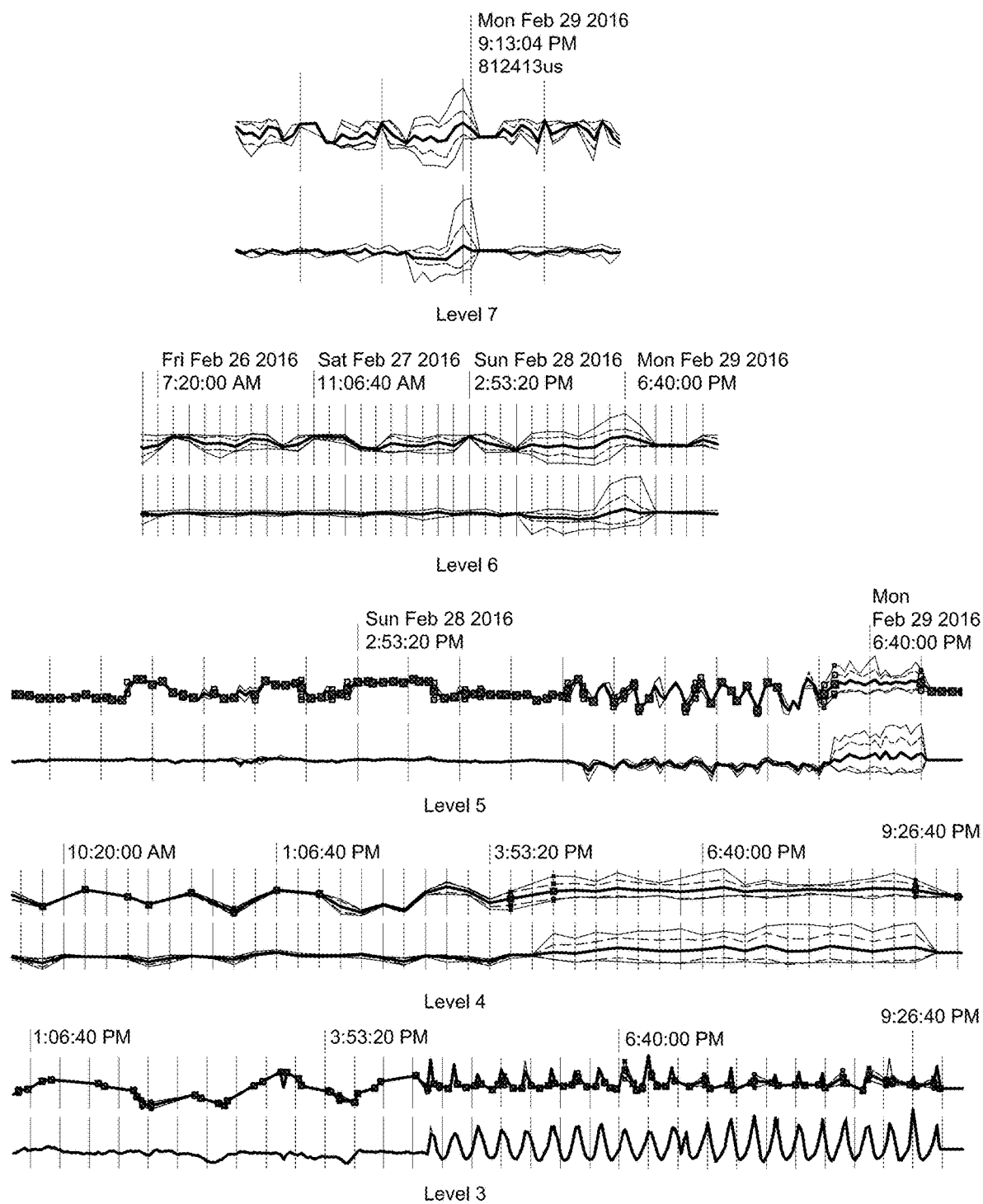
FIG. 11A illustrates progressive details of a signal through a series of zoom operations in accordance with some embodiments.
Figure 11B:
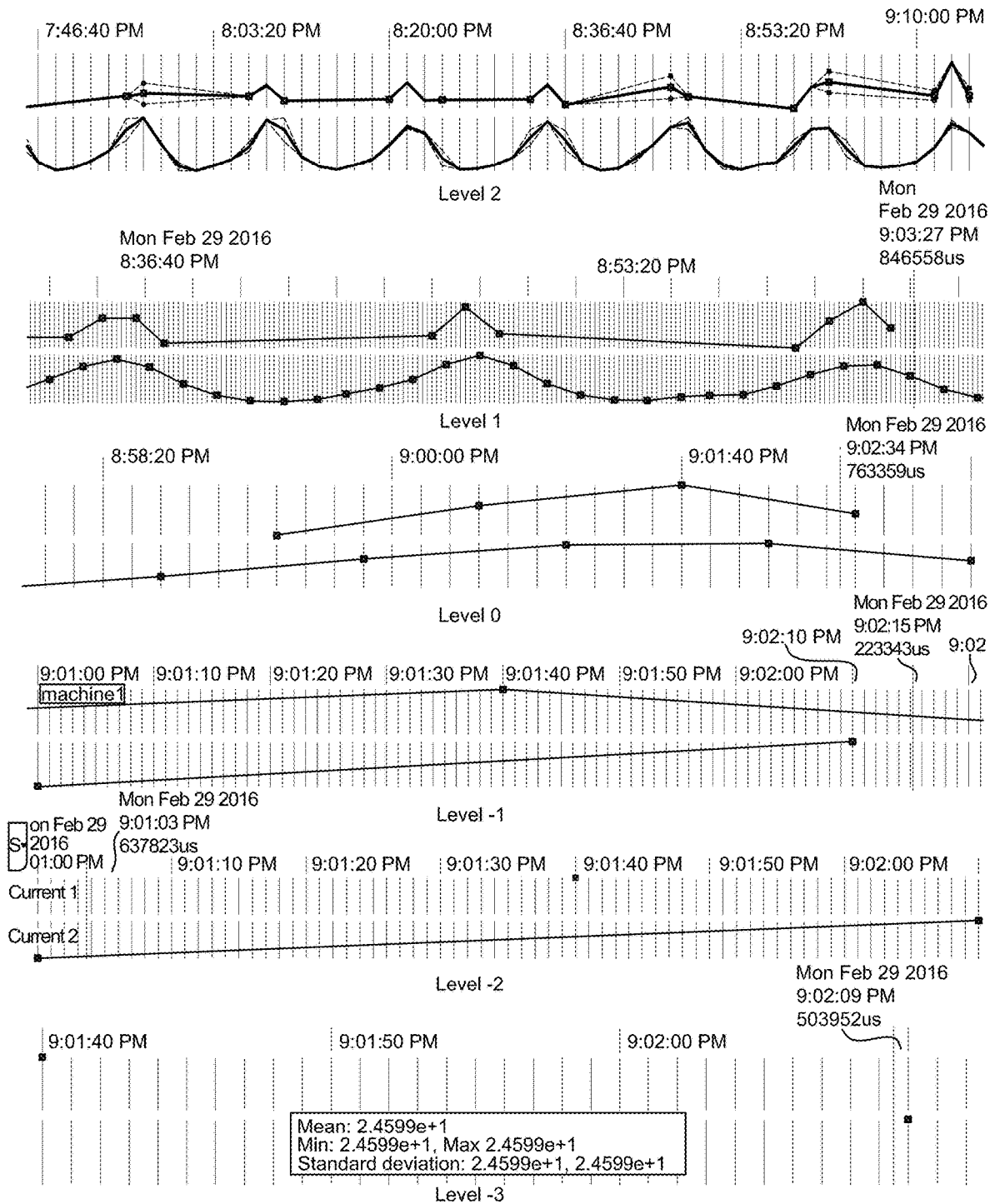
FIG. 11B further illustrates progressive details of a signal through a series of zoom operations in accordance with some embodiments.

As the user hones in on a point in time, a higher resolution and deeper view may be provided through a series of visuals in quick succession, which provides a fluid and hierarchical view of the underlying data at every resolution and enables attention to the areas with greater and interesting detail. FIG. 11A, FIG. 11B illustrate progressive details of a signal through a series of zoom operations, as described below, via an interactive graphical user interface. In FIG. 11A, progressive details of the signal from scale level 7 (R7) to scale level 3 (R3) are shown. In FIG. 11B, progressive details of the signal from scale level 2 (R2) to scale level −3 (R−3) are shown.

When the next requested resolution is awaited, the graphical display changes the displayed time range and fills it proportionally from the closest resolution tile available for the same range. This creates fluidity where resolution is developed progressively and where the user is always in view of a graphical display.

5.8 Gestures

Gestures are input combinations that may be used with a display of a client computer 104 to bring into view the exact data required by the user. These actions may be performed with either a trackpad or a pointer device (mouse) in conjunction with a keyboard. The interactive GUI may be responsive to gestures input via the trackpad or the pointer device communicatively coupled with the client computer 104. Table 4 shows example user gestures and respective actions.

TABLE 4

| Action | Trackpad | Mouse |
| --- | --- | --- |
| Zoom In (on mini-map and all lanes) | 1) Click + Drag<br>2) Shift + 2 Finger Vertical Scroll Down<br>3) Shift + Pinch | 1) Click + Drag<br>2) Shift + Mouse Scroll Up |
| Zoom Out | 1) Click + Drag<br>2) Shift + 2 Finger Vertical Scroll Up<br>3) Shift + Unpinch | 1) Click + Drag<br>2) Shift + Mouse Scroll Down |
| Pan/Scroll Horizontal | 1) Shift + Click Drag Horizontally<br>2) Shift + 2 Finger Vertical Scroll | Shift + Click Drag Horizontally |
| 10x Zoom In (on mini-map and all lanes) | Double click on any lane | Double click on any lane |
| Reset Time Range (on mini-map and all lanes) | Shift + Double click on any lane | Shift + Double click on any lane |

6.0 REAL-TIME PROCESSING

6.1 Tile Trees

The server computer 108 of FIG. 1 may process raw or actual operational data in real-time or in near real-time (e.g., as soon as it is generated by a machine, device, or equipment and received at the server computer 108). In an embodiment, the server computer 108 may use a data structure, such as a tree of tiles, to split and store the raw dataset. The tree may be a time dimension rollup hierarchy, as further discussed. The raw dataset may include an array of time-value pairs for each signal. The time component may not be continuous. However, at most one value may be associated with any given point in time (e.g., at a nanosecond resolution).

The tree comprising a plurality of nodes. The plurality of nodes includes parent nodes and child nodes. A parent node may be a root node or a branch node. A child node may be branch node or a leaf node. Each parent node may be a parent to one or more child nodes. Each child node has one parent node. Leaf nodes of the tree typically contain raw data. Each level in the tree may be associated with a resolution.

Each node of the tree corresponds with a tile, as discussed in Section 5. A tile may be a root tile (associated with a root node), a branch tile (associated with a branch node), or a leaf tile (associated with a leaf node). A tile may be a parent tile of one or more child tiles, and/or may be a child tile of a parent tile.

The time domain is split into a static number of partitions of the different tree depths. Each tile covers a range of time. All tiles at a given tree depth cover the same duration and have consecutive time periods (e.g., have starting points that are aligned to that duration such that none of them would overlap). The total length of time covered by a parent tile at a given tree depth is divided equally by their child tiles without overlap such that all points in time covered by a given child tile are only covered by its parent tile. In other words, all parent tiles have between 1 and TILE_SIZE number of cells and/or child tiles, and the time interval or duration covered by all child tiles of a parent tile is the same as the time interval covered by the parent tile.

Each tile may be divided into subsegments or cells of equal duration. The boundary of any child tile may be aligned to the cell boundaries of a cell in its parent tile.

When data time points of a time series are received, the data time points are generally added to corresponding leaf tiles. While different time series might correspond to different sampling frequencies, the data missing for a predetermined frequency can be shown as gaps or can be inferred based on neighboring data or historical or using other techniques known to someone skilled in the art.

In an embodiment, as long as the number of time slices for which data is recorded in a given time range does not exceed TILE_SIZE, a single tile is used to represent that time range. Cells in such a tile only contains raw measurements.

A configurable maximum leaf capacity (e.g., TILE_SIZE) in terms of the number of data time points may be enforced, and the server computer 108 may split an affected tile into multiple tiles when the maximum leaf capacity is reached. The same capacity restriction and split operation can apply to non-leaf tiles. The new tile can be created at the same depth as the overflowing tile or at a higher depth when the parent's maximum capacity is reached. This technique ensures that the entire dataset includes similarly sized tiles which can be traversed in order (e.g., depth-first) through only the necessary depths. This technique also efficiently serves requests concerning time ranges, which involve a reasonable number of data time points.

As an illustration, consider a time span that contains more data time points than can be transmitted efficiently, is to be viewed. Using the techniques described, an aggregate view of the data time points in a given dataset may be provided. Aggregate values (e.g., min, max, frequency, etc.) can be stored in non-leaf tiles to summarize the raw data. The aggregation may be executed by either combining raw values of its child leaf tiles or aggregates of child branch tiles. Each branch tile contains a set of chunks corresponding to the aggregates corresponding to each of their (non-empty) child tiles.

In an embodiment, the tree is built and updated bottom up, leaves to root (e.g., finer resolution to coarser resolution). As soon as there are enough tiles associated with depth d of the tree, a tile is created at depth d−1 of the tree. Similarly, if there are enough tiles associated at depth d−1 of the tree, a tile is created at depth d−2 of the tree. This process is recursively performed as long as the server computer 108 receives raw or actual operational data for real-time processing or near real-time processing.

Consistency of the aggregates may be maintained through a change queue. Each data time point that is written to the change queue may be associated with an identifier of an affected tile that has been determined for the data time point, as discussed in Section 5. Updates may be processed in "mini-batches" as updates of leaf tiles cause a recalculation of their aggregates and an update of their parent tile. This results in an operation replacing an existing chunk of the parent tile and that, as long as the grouping by tile ID is maintained or unchanged, does not require locking of the data structure. In an embodiment, the tile ID identifies both the time range and the resolution that is to be recomputed. Whenever recalculation is required, only this tile ID is communicated, and it will result in all the child nodes under that tile being recomputed as a batch.

An update of a parent tile causes an event on the same change queue to be dispatched so that all changes are processed on all levels. This approach allows for an eventual consistency of the aggregates, in that while the updates are being propagated, the values in a tile may still be in flux and might not agree with the value in a child tile or parent tile, but when the propagation is complete, the values in all tiles should be stabilized and correct. Therefore, different users would eventually view the same values for the same data.

Additional writes may cause write amplification. For example, when data is being gradually written in a time sequential manner, each such write may invalidate a whole new parent tile and trigger an entire batch update. However, writes increasingly grouped in the higher levels reduce write amplification. For example, all updates pertaining to the same tile are processed at once and a plurality of events can be discarded if it is clear that all updates up to a certain timestamp have been processed. This reduction of write amplification allows the server computer 108 to have a much lower latency in processing and storing received data at fine grained levels (close to the leaf nodes) than at the highest level (which could be in the order of magnitude of years).

In most instances, serving tiled or processed data requires finding required tiles and concatenating their content and/or transmitting the required tiles in succession. However, when a user request is for aggregated data of a certain resolution (e.g., a certain tree depth) in a range where the depth of leaves is higher than the requested tree depth, additional processing may be required. For example, raw data may be so sparse that generating and storing aggregate data would have caused too much write amplification. In such a case, the aggregates are generated from the sparse raw data and served out on the fly upon request. This may cause some additional CPU use; however, since this only happens when the data is very sparse, it does not noticeably affect the overall performance. Also, since the response can be cached, this computation does not need to be repeated too frequently.

In an embodiment, when a request for an affected tile is received, the request may be blocked until all updates for the affected tile are completed. For another example, a new tile may be created (for the affected tile) that includes all updates associated with the affected tile, and the data structure may be updated with a pointer swap to the new tile from the affected tile, which can be performed atomically. In this manner, a request may be fulfilled rather than being blocked.

6.2 Time-Dimension Hierarchy

Query latency may be managed by pre-materializing aggregate views of time series data along a static time dimension rollup hierarchy, as described above, which allows fast retrieval of needed data for visualization and analysis purposes.

The time hierarchy aggregates data over cells, where individual data time points observed within the time bounds of a cell are combined by an aggregation function into a single value to represent the cell's timespan. Cells may be identified by their leftmost coordinate as an int64 nanosecond offset from the Unix epoch.

Time series aggregates are materialized for several reasons, including speed of summarizing data over long time ranges. Time rollups may be desired using a hierarchy, with each level in the hierarchy being associated with a resolution. In an embodiment, the hierarchy includes asymmetric levels that reduce visual aliasing. The level of the hierarchy denoted as level 00 may be associated with resolution 0 (R0), while the topmost level of the hierarchy is denoted as level 14 and may be associated with resolution 14 (R14).

Table 5 shows resolutions (resolution ID), corresponding level IDs (different from tree depths), factors that aggregate lower levels to the next upper levels (for example, the Level R5 is obtained by aggregating six (5) Level R4 contents), and corresponding durations.

TABLE 5

| Level | Resolution ID | Factor | Cell Duration (Time scale) |
|---|---|---|---|
| 00 | −6 | 1 | 1 ns |
| 01 | −5 | 10 | 10 ns |
| 02 | −4 | 10 | 100 ns |
| 03 | −3 | 10 | 1 μ |
| 04 | −2 | 10 | 10 μ |
| 05 | −1 | 10 | 100 μ |
| 06 | 0 | 10 | 1 ms |
| 07 | 1 | 10 | 10 ms |
| 08 | 2 | 10 | 100 ms |
| 09 | 3 | 10 | 1 s |
| 10 | 4 | 10 | 10 s |
| 11 | 5 | 6 | 1 m |
| 12 | 6 | 10 | 10 m |
| 13 | 7 | 6 | 1 h |
| 14 | 8 | 24 | 1 d |

Aggregation factors aid in human interpretation of large volumes of data. When a user sees a single time slice at a high resolution, for example R8, then it is simpler and more understandable to see the duration of such a time range in whole values of such time slices.

For any given number of points and range of time, it may be possible to determine the optimum data resolution to be used as the maximum number of available time slices that fit into the desired range. For example, if the desired range of time is 3 days and the number of points desired for a certain screen resolution are 2,560, then the ideal resolution is R6 because that produces the smallest number greater than or equal to 1 for each point (2560/24/6/10=1.778). If a higher screen resolution is available than the number of data points, then the limited data resolution is visually conveyed through gaps between the points themselves.

6.3 Coordinate System

As discussed above, the time domain is split into a static number of partitions at each of the different tree depths or levels. At each tree depth or level, a partition is identified by the start time of that partition based on an even value pertaining to the cell width of that level. Therefore, a limited number of partitions exist at each level into which values can be recorded. Furthermore, for business practical purposes, such as between Jan. 1, 1970, and Dec. 31, 2070, there are only a fixed number of such partitions. Additionally, these partitions can be identified by an unsigned 64 bit integer even at the nanosecond time scale (e.g., R−6 as shown in Table 5 below).

A fixed coordinate system, such as the Unix epoch, may be used to determine tile locations. In this coordinate system, Date 0 is Jan. 1, 1970, and Date 1 is Jan. 2, 1970. Time 0 is 00:00:00.000 on Jan. 1, 1970, and Time 1 is 00:00:00: 001 on Jan. 1, 1970. By extension, a similar value exists for Nano 0 and Nano 1 at the nanosecond resolution.

This coordinate system is used to key tiles based on one or more time dimensions. In an embodiment, there are three dimensions of the coordinate system—date, milliseconds, and nanoseconds, each of which are counted in that unit since the Unix epoch. In an embodiment, there are no negative values of the dimensions of the coordinate system. In an embodiment, coordinates are used to directly locate tiles in a tile storage system.

Using a given time location (timestamp) and a given resolution (R), for example, as identified in a user request, a corresponding tile can be located to respond to the query. The tile identifier may be used to determine a specific location of data for retrieval and/or visualization and could be obtained by integer arithmetic on the required time of the range against the TILE_SIZE*R starting from Unix epoch.

In an embodiment, all the data of all the tiles required for a given time range and resolution are retrieved even if some of the cells in the response are outside of the required range. This accentuates the benefit of caching as there is a direct and stable mapping between tile requests and returned tiles.

6.4 Storage

In an embodiment, raw data and tiled (processed) data may be stored in a key-value database (such as S3, ABS, MinIO) as parquet datasets (parquet files). In an embodiment, parquet datasets are located by identifiers, such as tenant ID, datastream ID, and type (raw or aggregated). An example object store path is /<root>/<tenant>/<datastream>/<datastream|assessment/model>/<RAW|AGGREGATE>.

As discussed above, at a given resolution (R), each tile covers a portion of the time domain with length of TILE_SIZE*R. In an embodiment, three partition key pairs—date, time, and nanoseconds—each with a start and end value may be used to bracket the time range covered by the tile.

The timestamp T for a given resolution R can be mapped to a tile using integer division against TILE_SIZE. For example, a tile that holds R8 values for a given date T, the required date may be divided by TILE_SIZE to establish a start and end date pair using the floor and ceil operators. Corresponding time and nanos pairs are created for the given date. A combination of all three partition key pairs is used to locate the tile at the requested resolution.

For example, if the data repository 106 of FIG. 1 is a file system, then $TIME_SERIES_ID/SD=$START_DATE/ED=$END_DATE/ST=$START_TIME/ET=$END_TIME/SN=$START_NANOS/EN=$END_NANOS/L=$LEVEL_ID may be the directory structure for the filesystem-based data repository, wherein $TIME_SERIES_ID identifies time series data, identifiers corresponding to the three partition key pairs (e.g., $START DATE and $END DATE for date, $START TIME and $END TIME for time, and $START_NANOS and $END_NANOS for nanoseconds), and $LEVEL_ID identifies a level corresponding to the requested resolution. Using such a directory structure allows any request to be responded to with just one file retrieval. For another example, as discussed above, a parquet file may be created for each tile. The parquet file contains all cells for that resolution as rows.

6.5 Query Service

In response to receiving at the server computer an API call (e.g., user request) specifying a timestamp and a resolution, a corresponding tile is identified and accessed. In an embodiment, a user request may be generated that is already aligned with the resolution being sought. When the server computer receives the user request, the server computer extracts the timestamp to obtain a date component, a time component, and the nanosecond component. The server computer retrieves the tile in the data repository using this information.

A query service may implement logic to deliver a set of either datapoints or aggregate columns by merging data from hot and cold stores. API calls may be:

```
getCells(columns=ALL, start_time, end_time, level=NULL,
   count=800)
getPoints(time, count, direction=ascending)
```

For getcells( ), columns are aggregates such as avg, stdev, max, min, topN, etc. Either level or count may be specified but not both. If count is specified, the server computer will identify the level which provides at least count number of cells for the specified time range. In some embodiments, count may not exceed 10000.

For point display, the column firstpoint holds the timestamp of the first point in a cell. If the count for the cell is 1, then the aggregation values (e.g., min/max/etc.) apply to this point. For charting purposes, assigning each cell an integer number of pixels should suffice, but firstpoint offset can be used for detailed display, e.g., a hover.

A response to a request may include (1) the starting cell's start time, (2) the ending cell's end time, and (3) arrays of number in time sequence at cellspan step for each column requested. An example response may be:

```
{
   "startTime": "2020-01-01T12:00:00",
   "endTime": "2020-01-01T12:00:00",
   "avg": [ 1, 2, 3, ...],
   "max": [ 1, 1.5, 2.7, ...]
}
```

For example, a user computer (by extension, a user) wants to chart on a user interface a number of signals for some time range in some amount of display real estate. In an embodiment, the user computer may first ask for the mean aggregate for each signal with a resolution that allows a few pixels per point and, after retrieving and displaying those values, the user computer may follow up with requests for min, max, stdev, and/or another aggregate. This technique allows the user interface to render an approximate view faster. Other prioritization schemes and look-ahead queries are also possible.

7.0 HARDWARE IMPLEMENTATION

According to one embodiment, the techniques described herein are implemented by at least one computing device. The techniques may be implemented in whole or in part using a combination of at least one server computer and/or other computing devices that are coupled using a network, such as a packet data network. The computing devices may be hard-wired to perform the techniques, or may include digital electronic devices such as at least one application-specific integrated circuit (ASIC) or field programmable gate array (FPGA) that is persistently programmed to perform the techniques, or may include at least one general purpose hardware processor programmed to perform the techniques pursuant to program instructions in firmware, memory, other storage, or a combination. Such computing devices may also combine custom hard-wired logic, ASICs, or FPGAs with custom programming to accomplish the described techniques. The computing devices may be server computers, workstations, personal computers, portable computer systems, handheld devices, mobile computing devices, wearable devices, body mounted or implantable devices, smartphones, smart appliances, internetworking devices, autonomous or semi-autonomous devices such as robots or unmanned ground or aerial vehicles, any other electronic device that incorporates hard-wired and/or program logic to implement the described techniques, one or more virtual computing machines or instances in a data center, and/or a network of server computers and/or personal computers.

Figure 12:
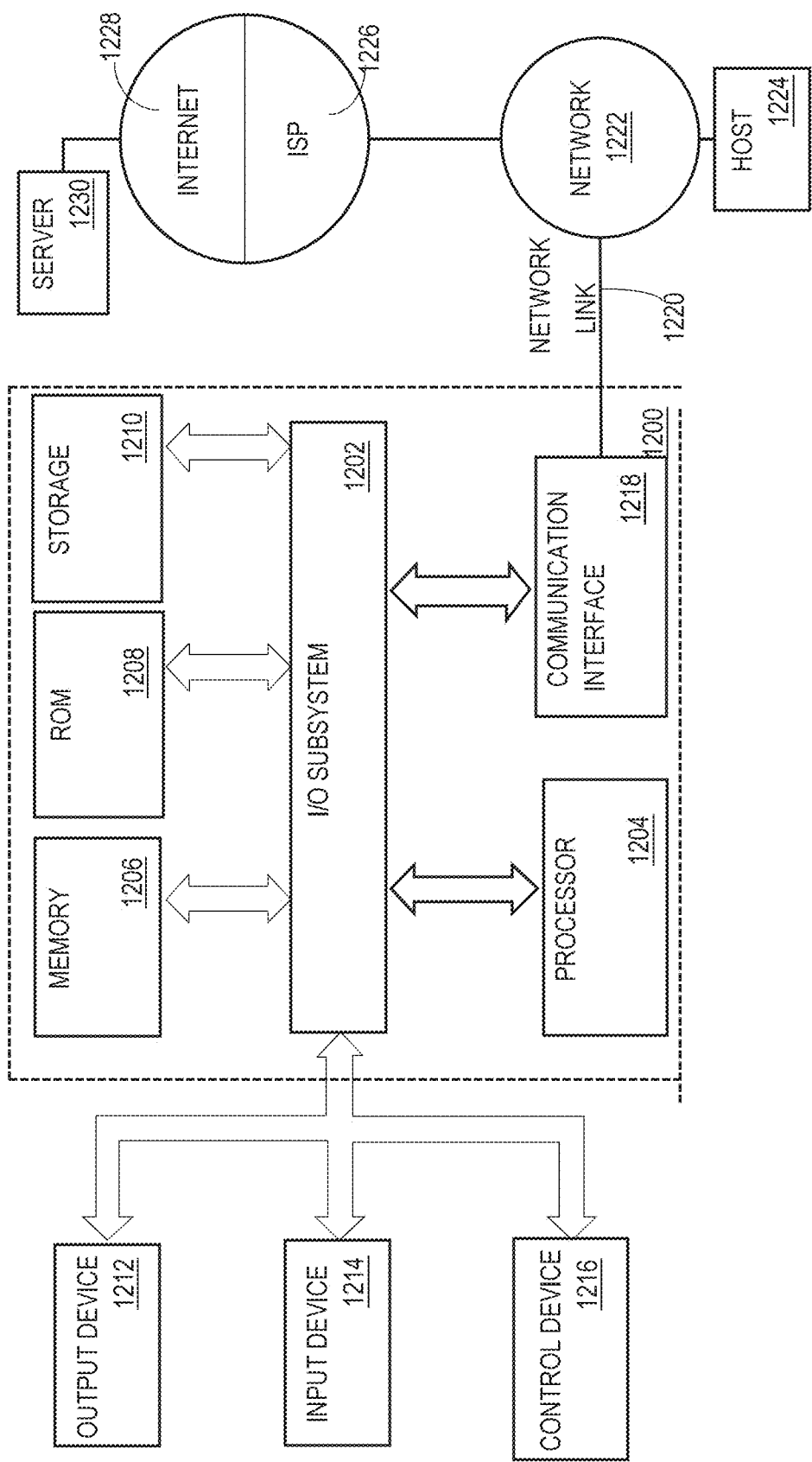
FIG. 12 provides an example block diagram of a computer system upon which an embodiment of the invention may be implemented.

FIG. 12 is a block diagram that illustrates an example computer system with which an embodiment may be implemented. In the example of FIG. 12, a computer system 1200 and instructions for implementing the disclosed technologies in hardware, software, or a combination of hardware and software, are represented schematically, for example as boxes and circles, at the same level of detail that is commonly used by persons of ordinary skill in the art to which this disclosure pertains for communicating about computer architecture and computer systems implementations.

Computer system 1200 includes an input/output (I/O) subsystem 1202 which may include a bus and/or other communication mechanism(s) for communicating information and/or instructions between the components of the computer system 1200 over electronic signal paths. The I/O subsystem 1202 may include an I/O controller, a memory controller and at least one I/O port. The electronic signal paths are represented schematically in the drawings, for example as lines, unidirectional arrows, or bidirectional arrows.

At least one hardware processor 1204 is coupled to I/O subsystem 1202 for processing information and instructions. Hardware processor 1204 may include, for example, a general-purpose microprocessor or microcontroller and/or a special-purpose microprocessor such as an embedded system or a graphics processing unit (GPU) or a digital signal processor or ARM processor. Processor 1204 may comprise an integrated arithmetic logic unit (ALU) or may be coupled to a separate ALU.

Computer system 1200 includes one or more units of memory 1206, such as a main memory, which is coupled to I/O subsystem 1202 for electronically digitally storing data and instructions to be executed by processor 1204. Memory 1206 may include volatile memory such as various forms of random-access memory (RAM) or other dynamic storage device. Memory 1206 also may be used for storing temporary variables or other intermediate information during execution of instructions to be executed by processor 1204. Such instructions, when stored in non-transitory computer-readable storage media accessible to processor 1204, can render computer system 1200 into a special-purpose machine that is customized to perform the operations specified in the instructions.

Computer system 1200 further includes non-volatile memory such as read only memory (ROM) 1208 or other static storage device coupled to I/O subsystem 1202 for storing information and instructions for processor 1204. The ROM 1208 may include various forms of programmable ROM (PROM) such as erasable PROM (EPROM) or electrically erasable PROM (EEPROM). A unit of persistent storage 1212 may include various forms of non-volatile RAM (NVRAM), such as FLASH memory, or solid-state storage, magnetic disk, or optical disk such as CD-ROM or DVD-ROM, and may be coupled to I/O subsystem 1202 for storing information and instructions. Storage 1210 is an example of a non-transitory computer-readable medium that may be used to store instructions and data which when executed by the processor 1204 cause performing computer-implemented methods to execute the techniques herein.

The instructions in memory 1206, ROM 1208 or storage 1210 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format retrieving instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. The instructions may implement a web server, web application server or web client. The instructions may be organized as a presentation layer, application layer and data storage layer such as a relational database system using structured query language (SQL) or no SQL, an object store, a graph database, a flat file system or other data storage.

Computer system 1200 may be coupled via I/O subsystem 1202 to at least one output device 1212. In one embodiment, output device 1212 is a digital computer display. Examples of a display that may be used in various embodiments include a touch screen display or a light-emitting diode (LED) display or a liquid crystal display (LCD) or an e-paper display. Computer system 1200 may include other type(s) of output devices 1212, alternatively or in addition to a display device. Examples of other output devices 1212 include printers, ticket printers, plotters, projectors, sound cards or video cards, speakers, buzzers or piezoelectric devices or other audible devices, lamps or LED or LCD indicators, haptic devices, actuators, or servos.

At least one input device 1214 is coupled to I/O subsystem 1202 for communicating signals, data, command selections or gestures to processor 1204. Examples of input devices 1214 include touch screens, microphones, still and video digital cameras, alphanumeric and other keys, keypads, keyboards, graphics tablets, image scanners, joysticks, clocks, switches, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 1216, which may perform cursor control or other automated control functions such as navigation in a graphical interface on a display screen, alternatively or in addition to input functions. Control device 1216 may be a touchpad, a mouse, a trackball, or cursor direction keys for communicating direction information and command selections to processor 1204 and for controlling cursor movement on display 1212. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism or other type of control device. An input device 1214 may include a combination of multiple different input devices, such as a video camera and a depth sensor.

In another embodiment, computer system 1200 may comprise an internet of things (IoT) device in which one or more of the output device 1212, input device 1214, and control device 1216 are omitted. Or, in such an embodiment, the input device 1214 may comprise one or more cameras, motion detectors, thermometers, microphones, seismic detectors, other sensors or detectors, measurement devices or encoders and the output device 1212 may comprise a special-purpose display such as a single-line LED or LCD display, one or more indicators, a display panel, a meter, a valve, a solenoid, an actuator or a servo.

When computer system 1200 is a mobile computing device, input device 1214 may comprise a global positioning system (GPS) receiver coupled to a GPS module that is capable of triangulating to a plurality of GPS satellites, determining and generating geo-location or position data such as latitude-longitude values for a geophysical location of the computer system 1200. Output device 1212 may include hardware, software, firmware and interfaces for generating position reporting packets, notifications, pulse or heartbeat signals, or other recurring data transmissions that specify a position of the computer system 1200, alone or in combination with other application-specific data, directed toward host 1224 or server 1230.

Computer system 1200 may implement the techniques described herein using customized hard-wired logic, at least one ASIC or FPGA, firmware and/or program instructions or logic which when loaded and used or executed in combination with the computer system causes or programs the computer system to operate as a special-purpose machine. According to one embodiment, the techniques herein are performed by computer system 1200 in response to processor 1204 executing at least one sequence of at least one instruction contained in main memory 1206. Such instructions may be read into main memory 1206 from another storage medium, such as storage 1210. Execution of the sequences of instructions contained in main memory 1206 causes processor 1204 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage 1210. Volatile media includes dynamic memory, such as memory 1206. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 1202. Transmission media can also take the form of acoustic or light waves, such as those generated during radio-wave and infra-red data communications.

Various forms of media may be involved in carrying at least one sequence of at least one instruction to processor 1204 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 1200 can receive the data on the communication link and convert the data to a format that can be read by computer system 1200. For instance, a receiver such as a radio frequency antenna or an infrared detector can receive the data carried in a wireless or optical signal and appropriate circuitry can provide the data to I/O subsystem 1202 such as place the data on a bus. I/O subsystem 1202 carries the data to memory 1206, from which processor 1204 retrieves and executes the instructions. The instructions received by memory 1206 may optionally be stored on storage 1210 either before or after execution by processor 1204.

Computer system 1200 also includes a communication interface 1218 coupled to bus 1202. Communication interface 1218 provides a two-way data communication coupling to network link(s) 1220 that are directly or indirectly connected to at least one communication networks, such as a network 1222 or a public or private cloud on the Internet. For example, communication interface 1218 may be an Ethernet networking interface, integrated-services digital network (ISDN) card, cable modem, satellite modem, or a modem to provide a data communication connection to a corresponding type of communications line, for example an Ethernet cable or a metal cable of any kind or a fiber-optic line or a telephone line. Network 1222 broadly represents a local area network (LAN), wide-area network (WAN), campus network, internetwork, or any combination thereof. Communication interface 1218 may comprise a LAN card to provide a data communication connection to a compatible LAN, or a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 1218 sends and receives electrical, electromagnetic, or optical signals over signal paths that carry digital data streams representing various types of information.

Network link 1220 typically provides electrical, electromagnetic, or optical data communication directly or through at least one network to other data devices, using, for example, satellite, cellular, Wi-Fi, or BLUETOOTH technology. For example, network link 1220 may provide a connection through a network 1222 to a host computer 1224.

Furthermore, network link 1220 may provide a connection through network 1222 or to other computing devices via internetworking devices and/or computers that are operated by an Internet Service Provider (ISP) 1226. ISP 1226 provides data communication services through a world-wide packet data communication network represented as internet 1228. A server computer 1230 may be coupled to internet 1228. Server 1230 broadly represents any computer, data center, virtual machine, or virtual computing instance with or without a hypervisor, or computer executing a containerized program system such as DOCKER or KUBERNETES. Server 1230 may represent an electronic digital service that is implemented using more than one computer or instance and that is accessed and used by transmitting web services requests, uniform resource locator (URL) strings with parameters in HTTP payloads, API calls, app services calls, or other service calls. Computer system 1200 and server 1230 may form elements of a distributed computing system that includes other computers, a processing cluster, server farm or other organization of computers that cooperate to perform tasks or execute applications or services. Server 1230 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format retrieving instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. Server 1230 may comprise a web application server that hosts a presentation layer, application layer and data storage layer such as a relational database system using structured query language (SQL) or no SQL, an object store, a graph database, a flat file system or other data storage.

Computer system 1200 can send messages and receive data and instructions, including program code, through the network(s), network link 1220 and communication interface 1218. In the Internet example, a server 1230 might transmit a requested code for an application program through Internet 1228, ISP 1226, local network 1222 and communication interface 1218. The received code may be executed by processor 1204 as it is received, and/or stored in storage 1210, or other non-volatile storage for later execution.

The execution of instructions as described in this section may implement a process in the form of an instance of a computer program that is being executed, and consisting of program code and its current activity. Depending on the operating system (OS), a process may be made up of multiple threads of execution that execute instructions concurrently. In this context, a computer program is a passive collection of instructions, while a process may be the actual execution of those instructions. Several processes may be associated with the same program; for example, opening up several instances of the same program often means more than one process is being executed. Multitasking may be implemented to allow multiple processes to share processor 1204. While each processor 1204 or core of the processor executes a single task at a time, computer system 1200 may be programmed to implement multitasking to allow each processor to switch between tasks that are being executed without having to wait for each task to finish. In an embodiment, switches may be performed when tasks perform input/output operations, when a task indicates that it can be switched, or on hardware interrupts. Time-sharing may be implemented to allow fast response for interactive user applications by rapidly performing context switches to provide the appearance of concurrent execution of multiple processes simultaneously. In an embodiment, for security and reliability, an operating system may prevent direct communication between independent processes, providing strictly mediated and controlled inter-process communication functionality.

8.0 Software Overview

Figure 13:
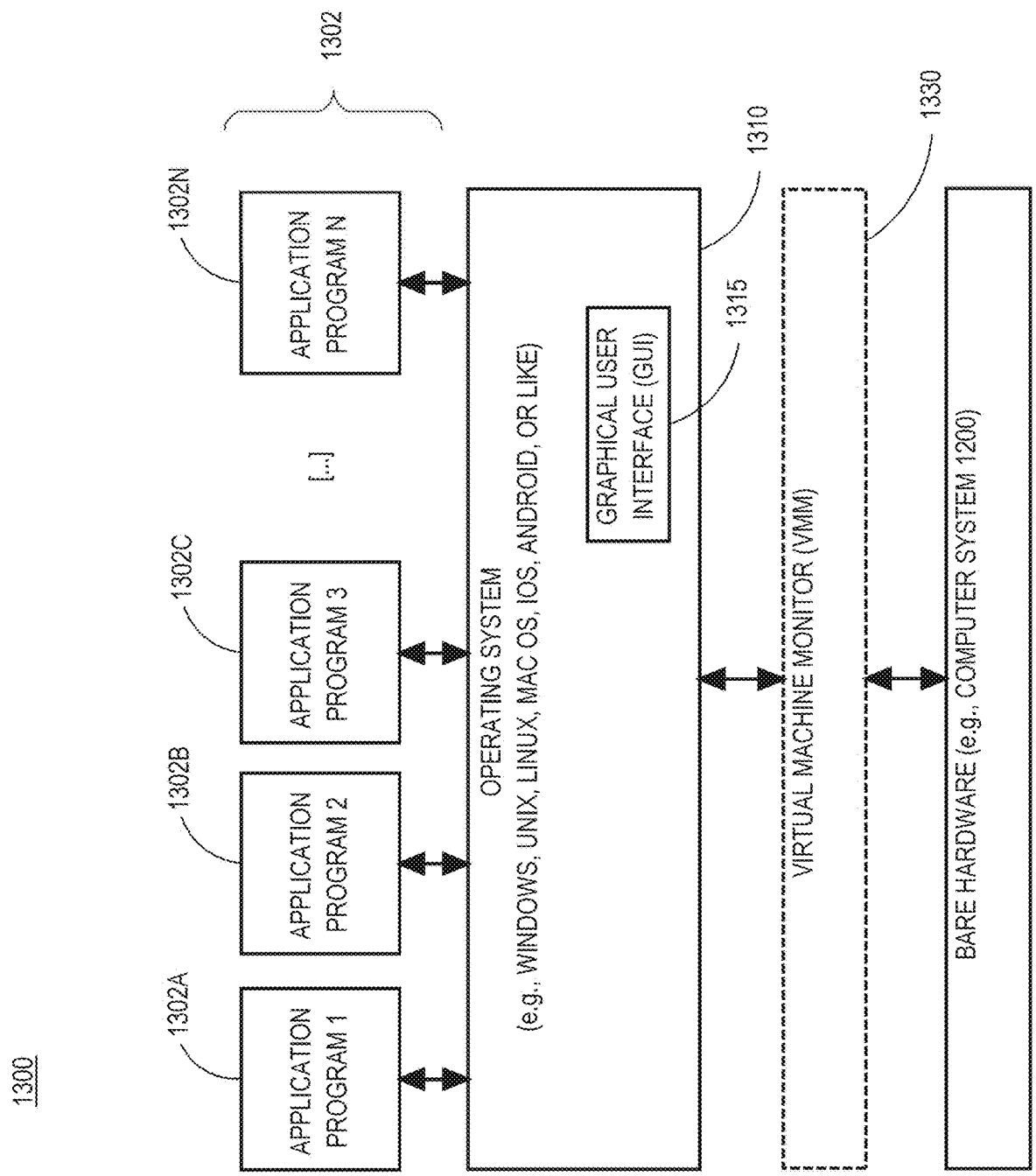
FIG. 13 provides an example block diagram of a basic software system for controlling the operation of a computing device.

FIG. 13 is a block diagram of a basic software system 1300 that may be employed for controlling the operation of computing device 1200. Software system 1300 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 1300 is provided for directing the operation of computing device 1200. Software system 1300, which may be stored in system memory (RAM) 1206 and on fixed storage (e.g., hard disk or flash memory) 1210, includes a kernel or operating system (OS) 1310.

The OS 1310 manages low-level aspects of computer operation, including managing execution of processes, memory allocation, file input and output (I/O), and device I/O. One or more application programs, represented as 1302A, 1302B, 1302C . . . 1302N, may be "loaded" (e.g., transferred from fixed storage 1210 into memory 1206) for execution by the system 1300. The applications or other software intended for use on device 1300 may also be stored as a set of downloadable computer-executable instructions, for example, for downloading and installation from an Internet location (e.g., a Web server, an app store, or other online service).

Software system 1300 includes a graphical user interface (GUI) 1315, for receiving user commands and data in a graphical (e.g., "point-and-click" or "touch gesture") fashion. These inputs, in turn, may be acted upon by the system 1300 in accordance with instructions from operating system 1310 and/or application(s) 1302. The GUI 1315 also serves to display the results of operation from the OS 1310 and application(s) 1302, whereupon the user may supply additional inputs or terminate the session (e.g., log off).

OS 1310 can execute directly on the bare hardware 1320 (e.g., processor(s) 1204) of device 1200. Alternatively, a hypervisor or virtual machine monitor (VMM) 1330 may be interposed between the bare hardware 1320 and the OS 1310. In this configuration, VMM 1330 acts as a software "cushion" or virtualization layer between the OS 1310 and the bare hardware 1320 of the device 1200.

VMM 1330 instantiates and runs one or more virtual machine instances ("guest machines"). Each guest machine comprises a "guest" operating system, such as OS 1310, and one or more applications, such as application(s) 1302, designed to execute on the guest operating system. The VMM 1330 presents the guest operating systems with a virtual operating platform and manages the execution of the guest operating systems.

In some instances, the VMM 1330 may allow a guest operating system to run as if it is running on the bare hardware 1320 of device 1200 directly. In these instances, the same version of the guest operating system configured to execute on the bare hardware 1320 directly may also execute on VMM 1330 without modification or reconfiguration. In other words, VMM 1330 may provide full hardware and CPU virtualization to a guest operating system in some instances.

In other instances, a guest operating system may be specially designed or configured to execute on VMM 1330 for efficiency. In these instances, the guest operating system is "aware" that it executes on a virtual machine monitor. In other words, VMM 1330 may provide para-virtualization to a guest operating system in some instances.

The above-described basic computer hardware and software is presented for purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

9.0 OTHER ASPECTS OF DISCLOSURE

In the foregoing specification, embodiments of the invention have been described with reference to numerous specific details that may vary from implementation to implementation. Thus, the sole and exclusive indicator of what is the invention and, is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage, or attribute that is not expressly recited in a claim should limit the scope of such claim in any way. The specification and drawings are, accordingly, to be regarded in an illustrative rather than a restrictive sense.

As used herein the terms "include" and "comprise" (and variations of those terms, such as "including", "includes", "comprising", "comprises", "comprised" and the like) are intended to be inclusive and are not intended to exclude further features, components, integers or steps.

Various operations have been described using flowcharts. In certain cases, the functionality/processing of a given flowchart step may be performed in different ways to that described and/or by different systems or system modules. Furthermore, in some cases a given operation depicted by a flowchart may be divided into multiple operations and/or multiple flowchart operations may be combined into a single operation. Furthermore, in certain cases the order of operations as depicted in a flowchart and described may be able to be changed without departing from the scope of the present disclosure.

It will be understood that the embodiments disclosed and defined in this specification extends to all alternative combinations of two or more of the individual features mentioned or evident from the text or drawings. All of these different combinations constitute various alternative aspects of the embodiments.

What is claimed is:

1. A computer-implemented method of managing multi-resolution time series data, comprising:
generating and storing, from time series data, a plurality of tiles for each resolution of a plurality of resolutions, wherein a first plurality of tiles associated with one resolution of the plurality of resolutions covers the same time period as a second plurality of tiles associated with another resolution of the plurality of resolutions, wherein each tile of the plurality of tiles for each resolution of the plurality of resolutions has a common number of N values, wherein the N values represent all measurements associated with a duration of time covered by the tile in the time series data and applies to all resolutions, wherein the duration of time is based on the associated resolution;

receiving, after generating the pluralities of tiles, a first user request from a requesting computer, the first user request specifying a first timestamp and a first resolution of the plurality of resolutions;

identifying a storage location of a first tile of the pluralities of tiles based on the first timestamp and the first resolution and, in response, retrieving the first tile at the storage location;

transmitting a first response including the first tile having N values and no other tile to the requesting computer for generating a visualization of the N values of the first tile simultaneously.

2. The computer-implemented method of claim 1, wherein each tile of the plurality of tiles associated with a certain resolution of the plurality of resolutions corresponds to a common length of time.

3. The computer-implemented method of claim 1, further comprising:

generating a plurality of supertiles for each resolution of the plurality of resolutions, wherein each of the plurality of supertiles associated with the resolution corresponds to a group of tiles of the plurality of tiles associated with the resolution and includes a supertile header that indicates a storage offset of each tile of the group of tiles.

4. The computer-implemented method of claim 3, the identifying comprising determining a first supertile from the plurality of supertiles associated with the first resolution based on the first timestamp.

5. The computer-implemented method of claim 1, wherein a length of a first duration of time associated with the first tile is dependent on the first resolution and includes a time of the first timestamp.

6. The computer-implemented method of claim 1, further comprising continuously receiving measurements of a signal generated by a sensor of an industrial equipment during operation of the industrial equipment, the generating being performed in real time with respect to receiving the measurements.

7. The computer-implemented method of claim 1, the generating comprising aggregating, for a certain tile associated with a certain resolution of the plurality of resolutions, values in a plurality of tiles associated with a lower resolution.

8. The computer-implemented method of claim 1, wherein the N values includes a count value, a top value, a unique value, or a frequency value over all measurements associated with a first duration of time covered by the first tile.

9. The computer-implemented method of claim 8, further comprising retrieving a second tile in response to receiving a second user request subsequent to the first user request, wherein when the second user request is associated with a zoom gesture, the second tile corresponds to a second duration of time that covers a time of the first timestamp and is different in length from the first duration of time associated with the first tile, and the second tile is in a supertile associated with a second resolution corresponding to the zoom gesture.

10. The computer-implemented method of claim 8, further comprising retrieving a second tile in response to receiving a second user request subsequent to the first user request, wherein when the second user request is associated with a pan gesture, the second tile corresponds to a second duration of time that has the same length as the first duration of time associated with the first tile and covers a time of a second timestamp that is different from the time of the first timestamp.

11. A computer-implemented method of managing multi-resolution time series data, comprising:

generating a user request specifying a time location on a timeline and a resolution of a plurality of resolutions, wherein the time location and the resolution specified in the user request identify a tile in a particular plurality of tiles from multiple pluralities of tiles, wherein each plurality of tiles of the multiple pluralities of tiles is associated with a different resolution, wherein a first plurality of tiles associated with one resolution covers the same time period as a second plurality of tiles associated with another resolution of the plurality of resolutions, wherein the user request is for viewing a first signal that is a categorical signal associated with a plurality of categorical events;

receiving data including the tile in response to the user request, wherein the tile corresponds to a duration of time covering the time location specified in the user request, wherein the tile comprises a plurality of aggregated values representing all data time points of the first signal that are in the duration of time corresponding to the tile;

generating a graphical display including a visualization of the plurality of aggregated values of the tile simultaneously, wherein the first signal is displayed as a barber-pole including a color stripe for each of the plurality of categorical events and having a constant thickness across the timeline.

12. The computer-implemented method of claim 11, wherein a length of the duration of time associated with the tile is dependent on the resolution specified in the user request.

13. The computer-implemented method of claim 11, wherein the plurality of aggregated values includes a count value, a top value, a unique value, or a frequency value of all data time points of the first signal that are in the duration of time corresponding to the tile.

14. The computer-implemented method of claim 11, wherein the plurality of aggregated values is displayed as proportional bars.

15. The computer-implemented method of claim 11, wherein the graphical display includes a visualization of a second signal that is plotted on the same timescale as the first signal is plotted, wherein the second signal and the first signal are sampled at different rates.

16. The computer-implemented method of claim 11, further comprising receiving a mouse-over input at a particular cursor position on the first signal;

in response to receiving the mouse-over input, generating a vertical cursor at the particular cursor position that runs vertically across all plots in the graphical display and generating a caption that indicates at least one of the plurality of aggregated values of the first signal at the particular cursor position.

17. A computer-implemented method of managing multi-resolution time series data, comprising:

generating a user request specifying a time location on a timeline and a resolution of a plurality of resolutions, wherein the user request is for viewing a first signal;

receiving, from a server, a tile of a plurality of tiles stored at the server in response to the user request, wherein the tile has a fixed number of values independent of the resolution, wherein the tile corresponds to a duration of time a length of which is dependent on the resolution, wherein the tile comprises a plurality of aggregated values representing all data time points of the first signal that are in the duration of time corresponding to the tile;

generating a graphical display including a visualization of the plurality of aggregated values of the tile.

18. The computer-implemented method of claim 17, wherein the first signal is a numerical signal, wherein the plurality of aggregated values includes a MIN value, a MAX value, a MEAN value, or a STDEV value of all data time points of the first signal that are in the duration of time corresponding to the tile.

19. The computer-implemented method of claim 17, wherein the plurality of aggregated values representing the first signal is displayed as a plurality of summary lines on one screen, wherein when a summary line of the plurality of summary lines is missing one or more data points forming a data gap, two nearest data points on either side of the data gap of the summary line are connected using a straight line.

20. The computer-implemented method of claim 17, further comprising receiving a mouse-over input at a particular cursor position on the first signal;

in response to receiving the mouse-over input, generating a vertical cursor at the particular cursor position that runs vertically across all plots in the graphical display and generating a caption that indicates at least one of the plurality of aggregated values of the first signal at the particular cursor position.

* * * * *